US012060122B2

(12) United States Patent
Allen et al.

(10) Patent No.: US 12,060,122 B2
(45) Date of Patent: Aug. 13, 2024

(54) MODULAR FRAME, TRACK FRAME HAVING A MODULAR FRAME, VEHICLE HAVING TRACK SYSTEMS, TRACK SYSTEM KIT, TENSIONER AND TRACK SYSTEM HAVING A TENSIONER

(71) Applicant: SOUCY INTERNATIONAL INC., Drummondville (CA)

(72) Inventors: Martin Allen, Drummondville (CA); Vincent Morin, St-Hyacinthe (CA); Yves Sauvageau, Drummondville (CA); Manuel Lemelin, St-Hyacinthe (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 17 days.

(21) Appl. No.: 17/949,393

(22) Filed: Sep. 21, 2022

(65) Prior Publication Data
US 2023/0088778 A1    Mar. 23, 2023

Related U.S. Application Data

(60) Provisional application No. 63/246,378, filed on Sep. 21, 2021.

(51) Int. Cl.
*B62D 55/084* (2006.01)
*B62D 55/065* (2006.01)
(Continued)

(52) U.S. Cl.
CPC ......... *B62D 55/084* (2013.01); *B62D 55/065* (2013.01); *B62D 55/10* (2013.01); *B62D 55/104* (2013.01); *B62D 55/12* (2013.01); *B62D 55/24* (2013.01); *B62D 55/30* (2013.01); *B62D 55/305* (2013.01)

(58) Field of Classification Search
CPC ...... B62D 55/00; B62D 55/08; B62D 55/084; B62D 55/065; B62D 55/10; B62D 55/104; B62D 55/12; B62D 55/24; B62D 55/30

See application file for complete search history.

(56) References Cited

U.S. PATENT DOCUMENTS 3,841,717 A    10/1974   Parisotto et al.
4,383,794 A    5/1983    Sankey
(Continued)

FOREIGN PATENT DOCUMENTS

CA    2800044 A1 *    6/2014    ........... B62D 55/084
CA    2995278 A1 *    8/2019    ........... B62D 55/065
(Continued)

*Primary Examiner* — Amy R Weisberg
*Assistant Examiner* — Matthew D Lee
(74) *Attorney, Agent, or Firm* — BCF LLP

(57) ABSTRACT

A modular frame for a track system is disclosed. The modular frame includes an upper frame member operatively connectable to an axle of a vehicle and removably connectable to a first lower frame member. The first lower frame member is configured to connect with at least one of a support wheel assembly and an idler wheel assembly, and connection of the upper frame member to the first lower frame member confers a first lower frame member-specific function to the track system. Another modular frame, track systems having the modular frames, tensioners and track systems having the tensioners are also disclosed.

19 Claims, 18 Drawing Sheets

(51) Int. Cl.
*B62D 55/10* (2006.01)
*B62D 55/104* (2006.01)
*B62D 55/12* (2006.01)
*B62D 55/24* (2006.01)
*B62D 55/30* (2006.01)

(56) References Cited

U.S. PATENT DOCUMENTS

| | | |
|---|---|---|
| 6,135,220 A | 10/2000 | Gleasman et al. |
| 7,874,387 B2 | 1/2011 | Despres |
| 9,914,497 B2 | 3/2018 | Zuchoski et al. |
| 10,266,215 B2 | 4/2019 | Jean et al. |
| 2011/0260527 A1* | 10/2011 | Bessette ................ B62D 55/14 305/165 |
| 2013/0134772 A1 | 5/2013 | Dandurand et al. |
| 2014/0175864 A1* | 6/2014 | Marchildon ........... B62D 55/15 305/130 |
| 2016/0075386 A1 | 3/2016 | Zuchoski et al. |
| 2017/0057571 A1* | 3/2017 | Einola ................... B62D 55/12 |
| 2017/0113742 A1 | 4/2017 | Parisotto et al. |
| 2019/0071140 A1 | 3/2019 | Buchanan |
| 2021/0108895 A1 | 4/2021 | Howe et al. |
| 2022/0297775 A1 | 9/2022 | Kjellmann |
| 2023/0235530 A1* | 7/2023 | Jones ..................... E02F 9/024 180/9.48 |

FOREIGN PATENT DOCUMENTS

| | | | |
|---|---|---|---|
| CN | 115535100 A | 12/2022 | |
| CN | 116161133 A | 5/2023 | |
| EP | 2441652 B1 | 4/2014 | |
| WO | WO2011041704 A1 | 4/2011 | |
| WO | WO-2014116227 A1 * | 7/2014 | ............ B62D 55/04 |
| WO | 2022036449 A1 | 2/2022 | |

* cited by examiner

MODULAR FRAME, TRACK FRAME HAVING A MODULAR FRAME, VEHICLE HAVING TRACK SYSTEMS, TRACK SYSTEM KIT, TENSIONER AND TRACK SYSTEM HAVING A TENSIONER

CROSS-REFERENCE TO RELATED APPLICATION

The present application claims priority to United States Provisional Patent Application No. 63/246,378, filed Sep. 21, 2021 entitled "Modular Frame, Track Frame Having a Modular Frame, Vehicle Having Track Systems, Track System Kit, Tensioner and Track System Having a Tensioner" which is incorporated by reference herein in its entirety.

TECHNICAL FIELD

The present technology relates to track systems. More precisely, the present technology relates to modular frames for track systems, track systems having modular frames, track system kits, tensioners, track systems having tensioners and vehicles having track systems.

BACKGROUND

Certain vehicles, such as, for example, agricultural vehicles (e.g., harvesters, combines, tractors, etc.), construction vehicles (e.g., bulldozers, front-end loaders, etc.), all-terrain vehicles (ATV) and utility task vehicles (UTV) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable construction vehicles to be used in wet field conditions as opposed to its wheeled counterpart.

Conventional track systems do, however, present some inconveniences. Some track systems may be optimized for given conditions, and thus would not be suitable for other conditions. For instance, a track system with more support wheels than another track system could present better traction but decreased handling properties when compared to that of another track system. To adapt or change properties of a track system operatively connected to a vehicle, the whole track system by another track system with different properties.

Therefore, there is a desire for a track system that can mitigate the above-mentioned issues.

SUMMARY

It is an object of the present technology to ameliorate at least some of the inconveniences present in the prior art.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Note that in the Figures, a "+" symbol is used to indicate an axis of rotation. In the context of the present technology, the term "axis" may be used to indicate an axis of rotation. Also, the terms "pivot assembly" and "wheel assemblies" include all the necessary structure (bearing structures, pins, axles and other components) to permit a structure/wheel to pivot/rotate about an axis, as the case may be. Moreover, the direction of forward travel of the track system is indicated by an arrow in FIG. 1A. In the present description, the "leading" components are components located towards the front of the vehicle defined consistently with the vehicle's forward direction of travel, and the "trailing" components are components located towards the rear of the vehicle defined consistently with the vehicle's forward direction of travel. In the following description and accompanying Figures, the track system is configured to be attached to a right side of the chassis of the vehicle. In the context of the present technology, the qualification of a wheel assembly as "at least indirectly connected" includes a wheel assembly that is directly connected to the at least one wheel-bearing frame member as well as a wheel assembly that is connected to the wheel-bearing frame member through an intermediate structure or structures, be they intermediate frame members or otherwise.

According to one aspect of the present technology, there is provided a modular frame for a track system, the modular frame includes an upper frame member operatively connectable to an axle of a vehicle and removably connectable to a first lower frame member. The first lower frame member is configured to connect with at least one of a support wheel assembly and an idler wheel assembly, and connection of the upper frame member to the first lower frame member confers a first lower frame member-specific function to the track system.

In some embodiments, the first lower frame member is replaceable with a second lower frame member, the second lower frame member being configured to connect with at least one of a support wheel assembly and an idler wheel assembly, and wherein connection of the upper frame member to the second lower frame member confers a second lower frame member-specific function to the track system.

In some embodiments, the first lower frame member is replaceable without disconnection of the upper frame member from the axle.

In some embodiments, the first lower frame member specific function and the second lower frame member specific function are different.

In some embodiments, the first and second lower frame members are structurally different.

In some embodiments, the idler wheel assembly comprises at least two laterally spaced idler wheels.

In some embodiments, the second lower frame member is configured to operatively connect with two support wheel assemblies.

In some embodiments, the second lower frame member is configured to operatively connect with three support wheel assemblies.

In some embodiments, the second lower frame member is configured to operatively connect with four support wheel assemblies.

In some embodiments, the first lower frame member induces a first ground contact area, the second lower frame member induces a second ground contact area, and the first ground contact area is different from the second ground contact area.

In some embodiments, the first lower frame member is replaceable with a third lower frame member.

In some embodiments, the upper frame member is connectable to the first lower frame member in at least two configurations.

In some embodiments, in a first of the at least two configurations, the upper frame member is in a first position relative to the first lower frame member, in a second of the at least two configurations, the upper frame member is in a second position relative to the first lower frame member, and wherein the first position is different from the second position.

In some embodiments, when the upper frame member is adjusted from the first configuration to the second configuration, the first lower frame member moves longitudinally relative to the upper frame member.

In some embodiments, when the upper frame member is adjusted from the first configuration to the second configuration, the first ground contact area moves longitudinally.

In some embodiments, when the upper frame member is adjusted from the first configuration to the second configuration, the first lower frame member moves laterally relative to the upper frame member.

In some embodiments, when the upper frame member is adjusted from the first configuration to the second configuration, the first ground contact area moves laterally.

In some embodiments, an extension frame member is removably connectable to at least one of the upper frame member and the first lower frame member, the extension frame member being configured to connect to at least one of a support wheel assembly and an idler wheel assembly.

In some embodiments, the modular frame further includes a mounting plate defining at least two apertures configured to receive a shaft connectable to an idler wheel assembly. When the shaft is received in a first of the at least two apertures, the idler wheel assembly is in a third position relative to the first lower frame member, and when the shaft is received in a second of the at least two apertures, the idler wheel assembly is in a fourth position relative to the one of the first lower frame member.

In some embodiments, the mounting plate is removably connectable to the first lower frame member.

In some embodiments, the at least two apertures are not defined symmetrically about a horizontal plane of the mounting plate, such that the mounting plate is removably connectable to the first lower frame member in a second configuration, and wherein when the shaft is received in the first of the at least two apertures, the idler wheel assembly is in a fifth position relative to the first lower frame member, and when the shaft is received in the second of the at least two apertures, the idler wheel assembly is in a sixth position relative to the first lower frame member.

In another aspect of the present technology, there is provided a track system including a modular frame according to the above aspect or according to the above aspect and one or more of the above embodiments, a sprocket wheel assembly rotationally connected to the modular frame, at least one idler wheel assembly rotationally connected to the modular frame, at least one support wheel assembly rotationally connected to the modular frame; and an elastomeric endless track. The elastomer endless track surrounds the modular frame, the sprocket wheel assembly, the at least one idler wheel assembly and the at least one support wheel assembly.

In another aspect of the present technology, there is provided a vehicle having a frame, a seat disposed on the frame, an engine supported by the frame and at least two track systems according to the above aspect, the at least two track systems being operatively connected to the engine.

In some embodiments, the track system has a first pair of track systems and a second pair of track systems. The first pair of track systems has the first lower frame member conferring the first lower frame member-specific function, and the second pair of track systems has the second lower frame member conferring the second lower frame member-specific function.

According to another aspect of the present technology, there is provided a modular frame for a track system, the modular frame having a first lower frame member removably connectable to an upper frame member, the first lower frame member being configured to connect with at least one of a support wheel assembly and an idler wheel assembly, and wherein connection of the first lower frame member to the upper frame member confers a first lower frame member-specific function to the track system.

In some embodiments, the first lower frame member is replaceable with a second lower frame member, the second lower frame member being configured to connect with at least one of a support wheel assembly and an idler wheel assembly, and wherein connection of the second lower frame member to the upper frame member confers a second lower frame member-specific function to the track system.

In some embodiments, the first lower frame member-specific function and the second lower frame member-specific function are different.

In some embodiments, the first and second lower frame members are structurally different.

In some embodiments, the second lower frame member is configured to operatively connect with two support wheel assemblies.

In some embodiments, the second lower frame member is configured to operatively connect with three support wheel assemblies.

In some embodiments, the second lower frame member is configured to operatively connect with four support wheel assemblies.

In some embodiments, the first lower frame member induces a first ground contact area, the second lower frame member induces a second ground contact area, and the first ground contact area is different from the second ground contact area.

In some embodiments, the first lower frame member is replaceable with a third lower frame member.

In some embodiments, the first lower frame member is connectable to the upper frame member in at least two configurations.

In some embodiments, in a first of the at least two configurations, the first lower frame member is in a first position relative to the upper frame member, and in a second of the at least two configurations, the first lower frame member is in a second position relative to the upper frame member, wherein the first position is different from the second position.

In some embodiments, when the first lower frame member is adjusted from the first configuration to the second configuration, the first lower frame member moves longitudinally relative to the upper frame member.

In some embodiments, when the first lower frame member is adjusted from the first configuration to the second configuration, induced ground contact area moves longitudinally.

In some embodiments, an extension frame member is removably connectable to at least one of the upper frame member and the first lower frame member, the extension frame member being configured to connect to at least one of a support wheel assembly and an idler wheel assembly.

In some embodiments, the modular frame further includes a mounting plate defining at least two apertures configured to receive a shaft connectable to an idler wheel assembly. When the shaft is received in a first of the at least two apertures, the idler wheel assembly is in a third position relative to the first lower frame member, and when the shaft is received in a second of the at least two apertures, the idler wheel assembly is in a fourth position relative to the one of the first lower frame member.

In some embodiments, the mounting plate is removably connectable to the first lower frame member.

In some embodiments, the at least two apertures are not defined symmetrically about a horizontal plane of the mounting plate, such that the mounting plate is removably connectable to the first lower frame member in a second configuration. When the shaft is received in the first of the at least two apertures, the idler wheel assembly is in a fifth position relative to the first lower frame member. When the shaft is received in the second of the at least two apertures, the idler wheel assembly is in a sixth position relative to the one of the first lower frame member.

According to another aspect of the present technology there is provided a track system having the modular frame according to the above aspect or according to the above aspect and one or more of the above embodiments, a sprocket wheel assembly rotationally connected to the modular frame, at least one idler wheel assembly rotationally connected to the modular frame, at least one support wheel assembly rotationally connected to the modular frame, and an elastomeric endless track. The elastomeric endless track surrounds the modular frame, the sprocket wheel assembly, the at least one idler wheel assembly and the at least one support wheel assembly.

According to another aspect of the present technology there is provided a modular frame for a track system, the modular frame including an upper frame member operatively connectable to an axle of a vehicle and a first lower frame member removably connected to the upper frame member, having a first length, a first number of support wheel assembly and a second number of idler wheel assemblies. The first lower frame member is selectively replaceable with a second lower frame member having a second length, a third number of support wheel assemblies and a fourth number of idler wheel assemblies.

According to another aspect of the present technology, there is provided a track system having a modular frame having an upper frame and a first lower frame. The upper frame member is operatively connectable to an axle of a vehicle, and the first lower frame member is removably connectable to the upper frame member. The track system also includes a sprocket wheel assembly rotationally connected to the upper frame member, at least one idler wheel assembly rotationally connected to the first lower frame member, at least one support wheel assembly rotationally connected to the first lower frame member, and an elastomeric endless track. The elastomeric endless track surrounds the modular frame, the sprocket wheel assembly, the at least one idler wheel assembly and the at least one support wheel assembly. The first lower frame is replaceable with a second lower frame member.

In some embodiments, the track system is one of a front track system and a rear track system.

In some embodiments, the first lower frame member is replaceable without disconnection of the upper frame member from the axle.

In some embodiments, the first and second lower frame members are structurally different.

In some embodiments, in the first configuration, the track system has a first contact area and in the second configuration, the track system has a second contact area. The first contact area is different from the second contact area.

In some embodiments, the first lower frame member is replaceable with a third lower frame member.

In some embodiments, the upper frame member is connectable to the first lower frame member in at least two configurations.

According to another aspect of the present technology, there is provided a track system kit a track system and a second lower frame. The track system includes a modular frame having an upper frame member and a first lower frame member. The upper frame member is operatively connectable to an axle of a vehicle, and the first lower frame member is removably connectable to the upper frame member. The track system also includes a sprocket wheel assembly rotationally connected to the upper frame member, at least one idler wheel assembly rotationally connected to the first lower frame member, at least one support wheel assembly rotationally connected to the first lower frame member and an elastomeric endless track. The elastomeric endless track surrounds the modular frame, the sprocket wheel assembly, the at least one idler wheel assembly and the at least one support wheel assembly. The first lower frame is replaceable with a second lower frame member.

According to another aspect of the present technology, there is provided a modular frame for a track system. The modular frame includes an upper frame member operatively connectable to an axle of a vehicle and a lower frame member removably connectable to the upper frame member. The upper lower frame member is removably connectable to the upper frame member in at least two configurations.

In some embodiments, the lower frame member is connectable to at least one of a support wheel assembly and an idler wheel assembly.

In some embodiments, in a first of the at least two configurations, the upper frame member is at a first position relative to the lower frame member, and in a second of the at least two configurations, the upper frame member is at a second position relative to the lower frame member.

In some embodiments, in the first configuration, the modular frame induces a first contact area and in the second configuration, the modular frame induces a second contact area. The first contact area is different from the second contact area.

According to another aspect of the present technology there is provided a track system having a modular frame according to the above aspect or according to the above aspect and one or more of the above embodiments, a sprocket wheel assembly rotationally connected to the modular frame, at least one idler wheel assembly rotationally connected to the modular frame, at least one support wheel assembly rotationally connected to the modular frame and an elastomeric endless track. The elastomeric endless track surrounds the modular frame, the sprocket wheel assembly, the at least one idler wheel assembly and the at least one support wheel assembly.

According to another aspect of the present technology there is provided a track system including a modular frame having an upper frame member and a lower frame member. The upper frame member is operatively connectable to an axle of a vehicle, and the lower frame member removably connectable to the upper frame member. The track system also includes a sprocket wheel assembly rotationally connected to the modular frame, at least one idler wheel assembly rotationally connected to the modular frame, at least one support wheel assembly rotationally connected to the modular frame, and an elastomeric endless track. The elastomeric endless track surrounds the modular frame, the sprocket wheel assembly, the at least one idler wheel assembly and the at least one support wheel assembly. The upper lower frame member is removably connectable to the upper frame member in at least two configurations.

According to another aspect of the present technology there is provided a tensioner for adjusting a tension in an endless track of a track system, the tensioner having a resilient portion and a wheel connecting portion. The resilient portion is connectable to a frame of the track system and is oriented generally vertically. The wheel connecting portion is pivotally connectable to the frame of the track system, is connected to the resilient portion and is configured to connect to an idler wheel assembly.

In some embodiments, the resilient portion is oriented 80 degrees away from an axis of rotation of the idler wheel assembly.

In some embodiments, the resilient portion is oriented 60 degrees away from the axis of rotation of the idler wheel assembly.

In some embodiments, the resilient portion is oriented 45 degrees away from the axis of rotation of the idler wheel assembly.

In some embodiments, the resilient portion includes a spring.

In some embodiments, the resilient portion includes a resilient member made from a polymeric material.

In some embodiments, an idler wheel assembly is connected to the wheel connecting portion. The idler wheel assembling includes two laterally spaced wheels, and the resilient portion is disposed laterally between the two laterally spaced wheels.

In some embodiments, the tensioner has a vertical footprint defined by a height and a longitudinal footprint defined by a length, the vertical footprint being greater than the longitudinal footprint.

In some embodiments, a height over length ratio of the tensioner is about 2 to 1.

In some embodiments, a height over length ratio of the resilient portion is about 4 to 1.

According to another aspect of the present technology, there is provided a track system having a frame, a tensioner, a sprocket wheel assembly, at least one idler wheel assembly, at least one support wheel assembly and an elastomeric endless track. The tensioner includes a resilient portion and a wheel connecting portion. The resilient portion is connected to the frame, and is oriented generally vertically. The wheel connecting portion is pivotally connected to the frame and connected to the resilient portion. The sprocket wheel assembly is rotationally connected to the frame, the at least one idler wheel assembly is rotationally connected to the wheel connecting portion of the tensioner, the at least one support wheel assembly is rotationally connected to the frame, and the elastomeric endless track surrounds the frame, the sprocket wheel assembly, the at least one idler wheel assembly and the at least one support wheel assembly.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1A:
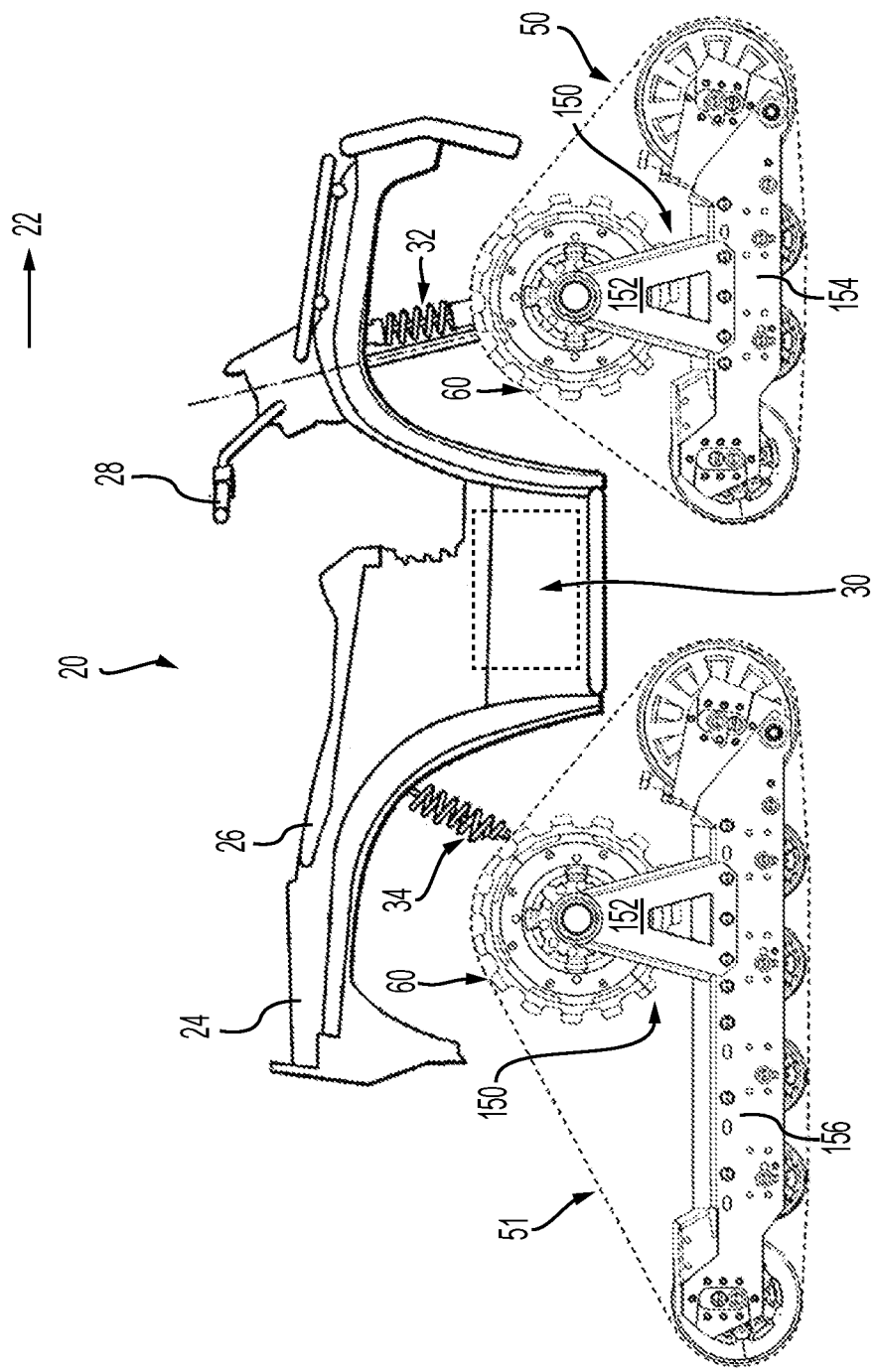
FIG. 1A is a right side elevation view of a vehicle with front and rear track systems having modular frames according to embodiments of the present technology and endless tracks.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

Referring to FIG. 1A, a vehicle 20 is shown. The vehicle 20 is an all-terrain vehicle (ATV). It is contemplated that in other embodiments, the vehicle 20 could be another recreational vehicle such as an off-road utility terrain vehicle (UTV), a side-by-side vehicle (SSV) or a snowmobile. It is also contemplated that the vehicle 20 could be a harvester, a tractor, or another agricultural vehicle. Other vehicles are contemplated, and the present technology is structured and configured to be used on such vehicles. The direction of forward travel of the vehicle 20 is indicated by arrow 22.

The vehicle 20 has a frame 24. A straddle seat 26 is disposed on a top of the frame 24, and is configured to accommodate a single driver. It is contemplated that in some embodiments, the straddle seat 26 could be configured to seat more than two passengers. A handlebar 28 is operatively connected to the frame 24. The handlebar 28 is operable by a driver to steer the vehicle 20 as desired. It is contemplated that in other embodiments, the vehicle 20 could have another steering system such as a driving wheel. An engine 30 (shown schematically in FIG. 1A) is supported by the frame 24, and is operatively connected to front and rear axles (not shown) of the vehicle 20. In some embodiments, the engine 30 could be operatively connected to only one of the front and rear axles. The vehicle 20 further has a front suspension system 32 connected to the vehicle 20 and to the front axle, and a rear suspension system 34 connected to the vehicle 20 and to the rear axle. The front and rear suspension systems 32, 34 are independent of one another. The vehicle 20 further has left and right front track systems 50 (only right front track system shown) and left and right rear track systems 51 (only right rear track system shown).

Figure 1B:
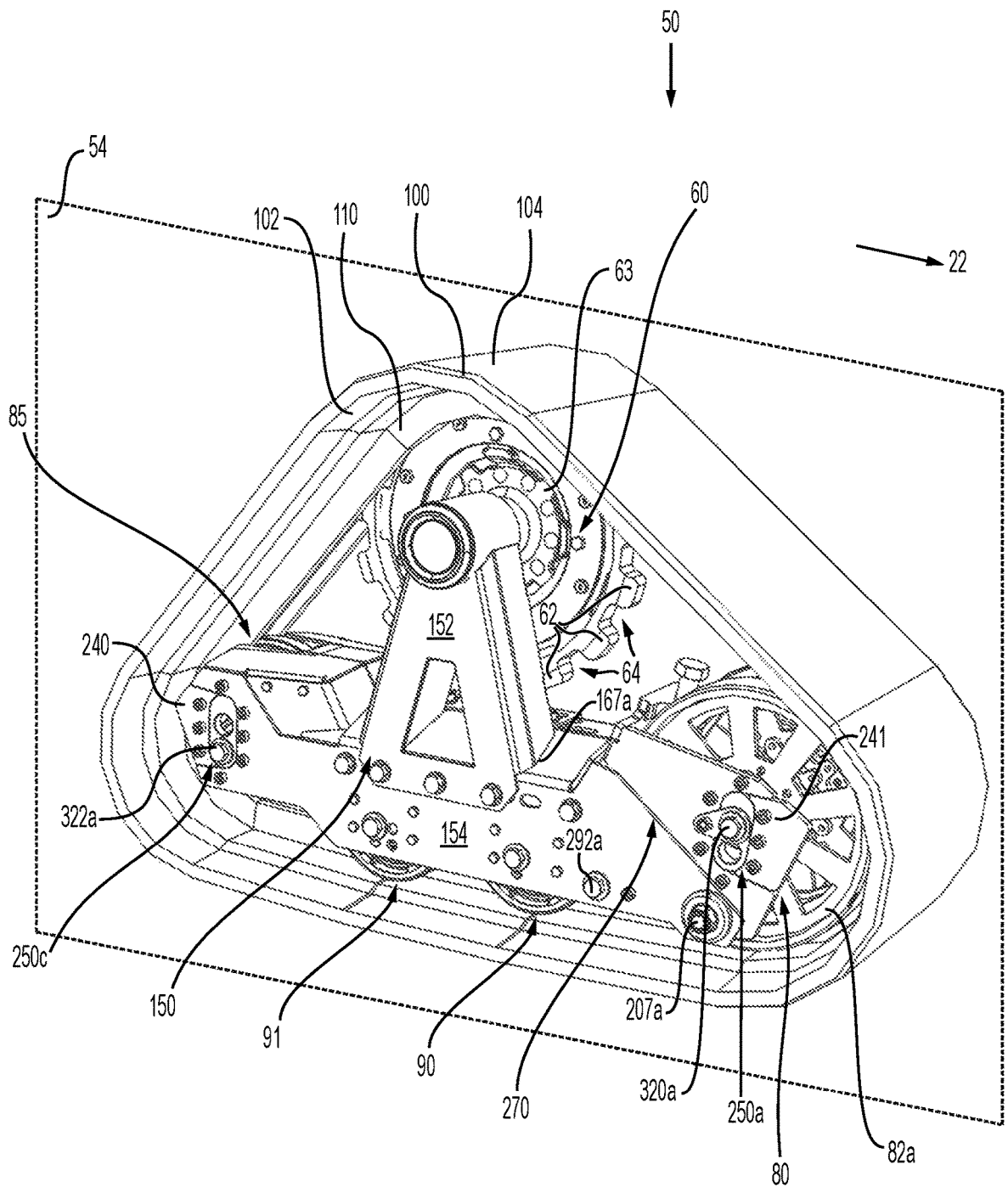
FIG. 1B is a perspective view taken from a top, front, right side of the front, right track system of FIG. 1A.

The track systems 50, 51, which are both embodiments according to the present technology, are similar, and hence only track system 50 which includes the present technology and is shown in FIG. 1B will be described in greater detail. The track system 50 is configured to be operatively connectable to the vehicle 20. More precisely, the track system 50 is configured to connect to a front, right side of the vehicle 20. As will be described in greater detail below, the track system 50 could be configured to connect to a front, left side of the vehicle 20, a rear, left side of the vehicle 20 or a rear, right side of the vehicle 20. The track system 50 defines a longitudinal center plane 54.

Still referring to FIG. 1B, the track system 50 has a sprocket wheel assembly 60 that is operatively connected to the front axle of the vehicle 20. The axle can rotate the sprocket wheel assembly 60 which in turn can drive the track system 50. The sprocket wheel assembly 60 has a plurality of teeth 62 extending radially outwardly from a radial surface of the sprocket wheel assembly 60. As such, the sprocket wheel assembly 60 defines a plurality of recesses 64, where each of the recesses 64 is defined by two adjacent teeth 62. As will be described in greater detail below, the sprocket wheel assembly 60 is configured to engage with an endless track 100.

The track system 50 also has a modular frame 150 to which the sprocket wheel assembly 60 is rotationally connected. The modular frame 150 includes an upper frame member 152 and a lower frame member 154. As will be described in greater detail below, the modular frame 150 is modular in various aspects, one such aspect being that the upper and lower frame members 152, 154 can be disconnected and re-connected in different configurations to achieve different functions.

Figure 2:
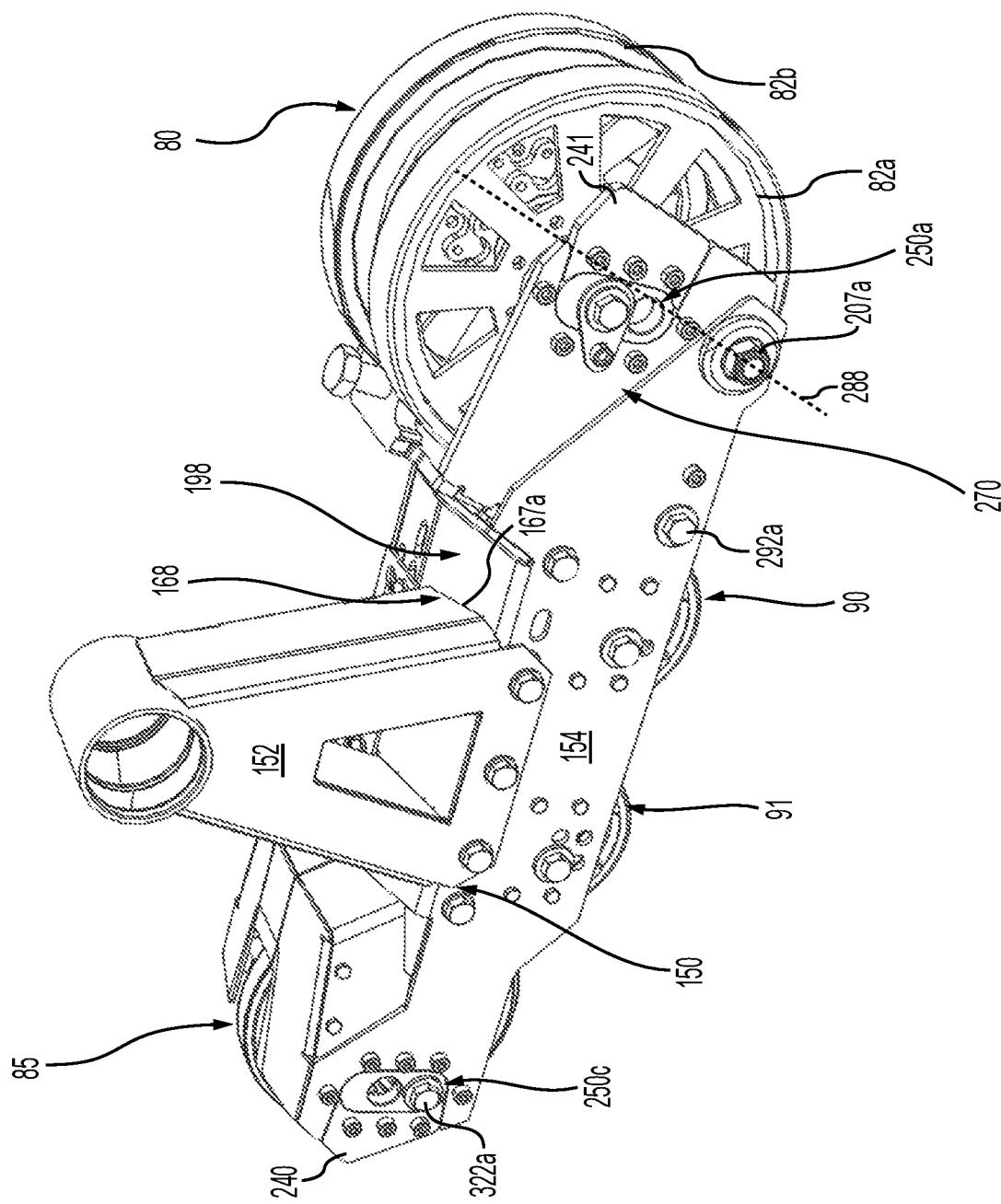
FIG. 2 is a perspective view taken from a top, front, right side of the modular frame of FIG. 1B connected to front and rear idler wheel assemblies and support wheel assemblies.
Figure 3:
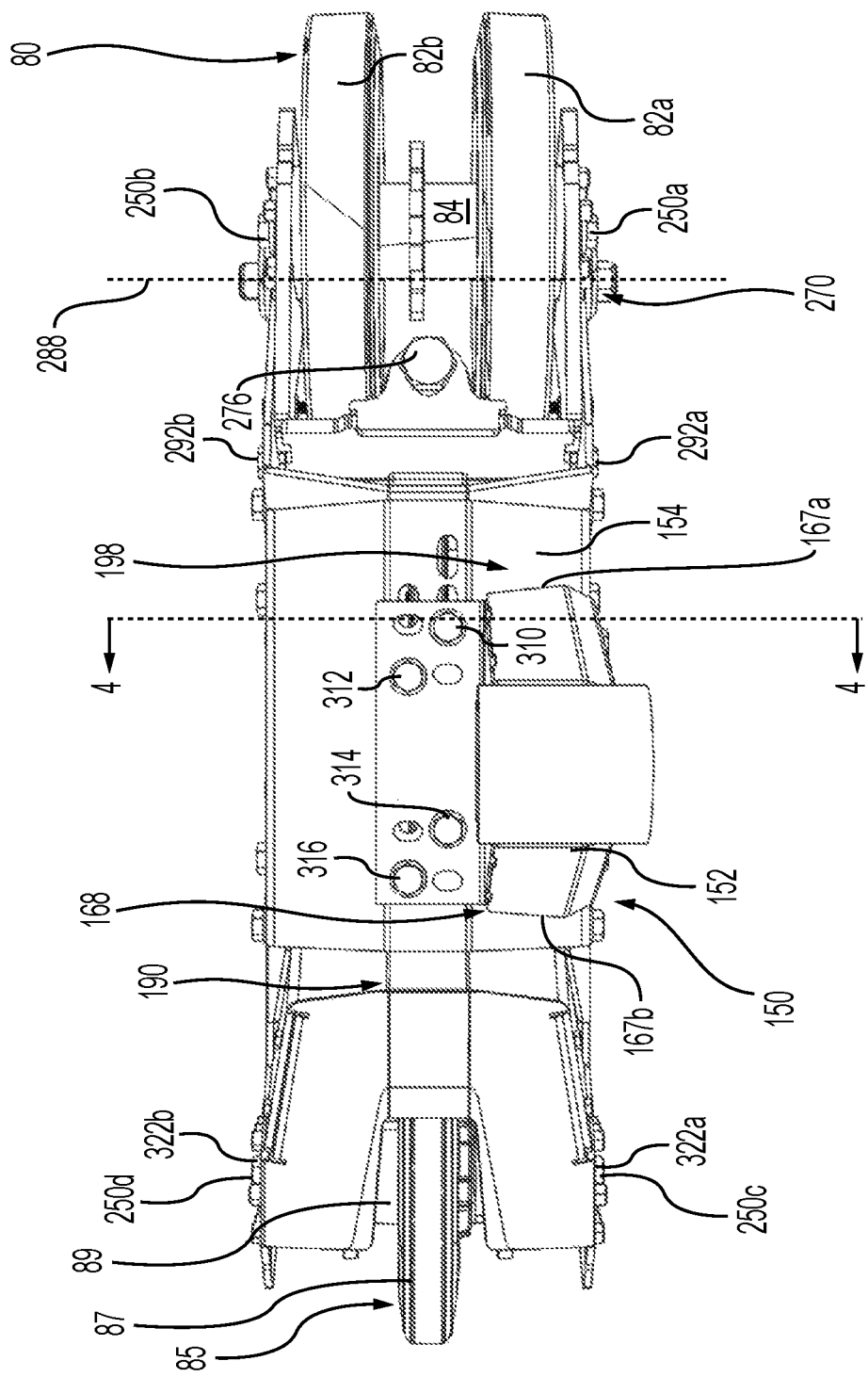
FIG. 3 is top plan view of the modular frame of FIG. 2.

As best seen in FIGS. 2 and 3, the track system 50 includes a leading idler wheel assembly 80 that is disposed at a forward end of the track system 50, and that is rotationally connected to the lower frame member 154 by a tensioner 270. More precisely, as will be described in greater detail below, the leading idler wheel assembly 80 is connected to the tensioner 270 by a pair of mounting plates 250a, 250b, and the tensioner 270 is, in turn, connected to the lower frame member 154. It is contemplated that in some embodiments, the leading idler wheel assembly 80 could be directly rotationally connected to the lower frame member 154 (i.e., without the mounting plates 250a, 250b). The leading idler wheel assembly 80 has two laterally spaced wheels 82a, 82b connected by an axle 84. The two wheels 82a, 82b are configured to engage an inner surface 102 of the endless track 100. In some embodiments, the leading idler wheel assembly 80 could only have a single wheel or could have three or more wheels.

The track system 50 also includes a trailing idler wheel assembly 85 that is disposed at a rear end of the track system 50, and that is rotationally connected to the lower frame member 154 by a pair of mounting plates 250c, 250d, which will be described in greater detail below. It is contemplated that in some embodiments, the trailing idler wheel assembly 85 could be directly rotationally connected to the lower frame member 154 (i.e., without the mounting plates 250c, 250d). The trailing idler wheel assembly 85 includes a single wheel 87 and an axle 89. The single wheel 87 is configured to engage the inner surface 102 of the endless track 100. In some embodiments, the trailing idler wheel assembly 85 could have two or more wheels.

Figure 4:
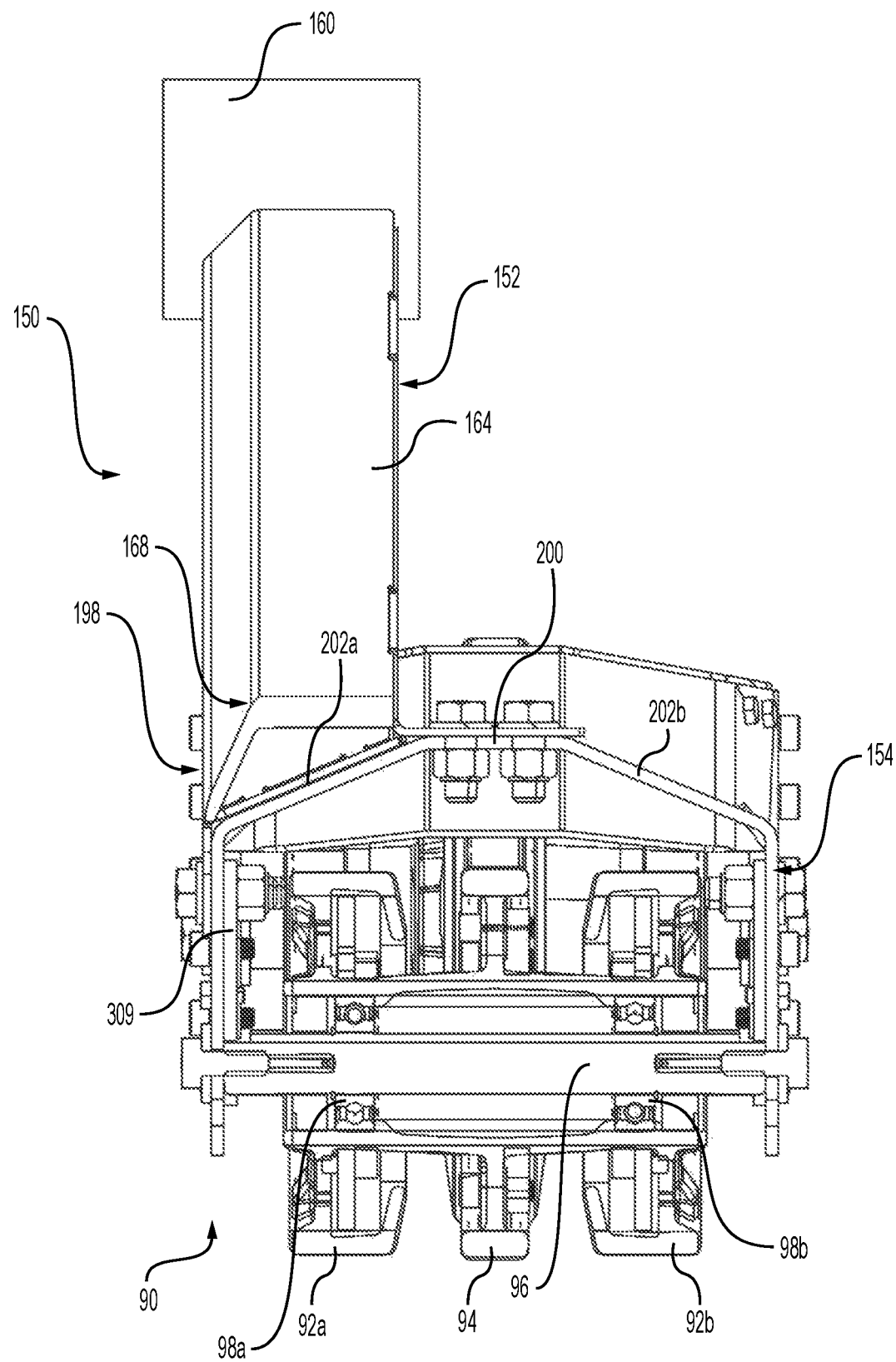
FIG. 4 is a cross-sectional view of the modular frame of FIG. 2 taken across the lines 4-4 of FIG. 3.

The track system 50 further includes two support wheel assemblies 90, 91 that are disposed longitudinally between the leading and trailing idler wheel assemblies 80, 85. As the two support wheel assemblies 90, 91 are the same, only the support wheel assembly 90 will be described in detail herewith. As best seen in FIG. 4, the support wheel assembly 90 includes three laterally spaced and interconnected wheels: two side wheels 92a, 92b and an intermediate wheel 94. The interconnected side wheels 92a, 92b and intermediate wheel 94 are rotationally connected to the lower frame member 154 by an axle 96. The interconnected side wheels 92a, 92b and intermediate wheel 94 are connected to the axle 96 by bearings 98a, 98b. The side wheels 92a, 92b are wider than the intermediate wheel 94. The two side wheels 92a, 92b and the intermediate wheel 94 are configured to engage the inner surface 102 of endless track 100. It is understood that in other embodiments, the support wheel assemblies 90, 91 could include more or fewer than three laterally spaced and interconnected wheels.

The track system 50 also includes the endless track 100 which extends around components of the track system 50, including the sprocket wheel assembly 60, the modular frame 150, the leading and trailing idler wheel assemblies 80, 85 as well as the support wheel assemblies 90, 91. In the present embodiment, the endless track 100 is an endless polymeric track. It is contemplated that in some embodiments, the endless track 100 could be constructed of a wide variety of materials and structures including metallic components known in track systems. The endless track 100 has the inner surface 102 and an outer surface 104.

Figure 9:
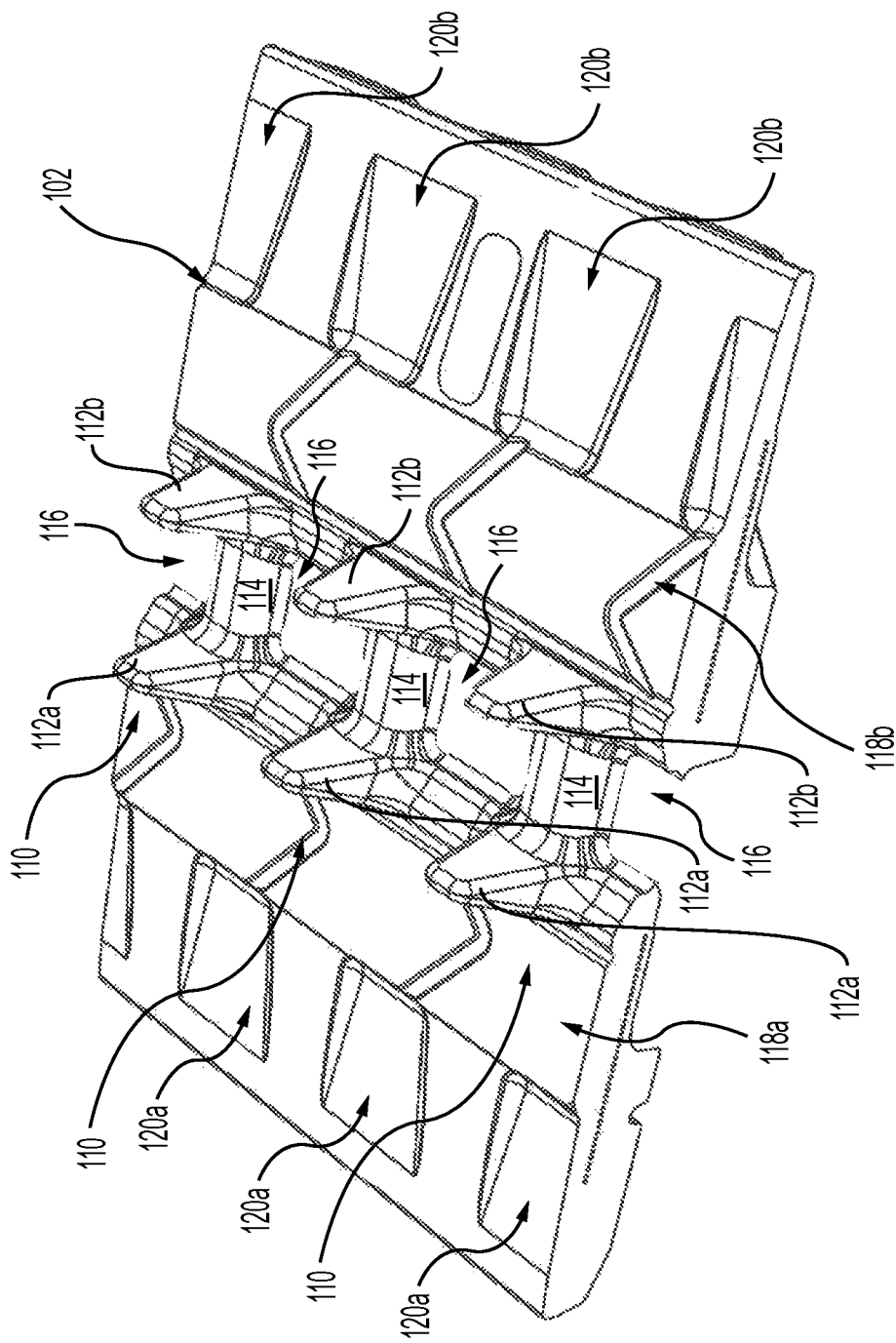
FIG. 9 is a perspective view taken from a top, rear, right side of an endless track portion of the endless track of FIG. 1B.
Figure 10:
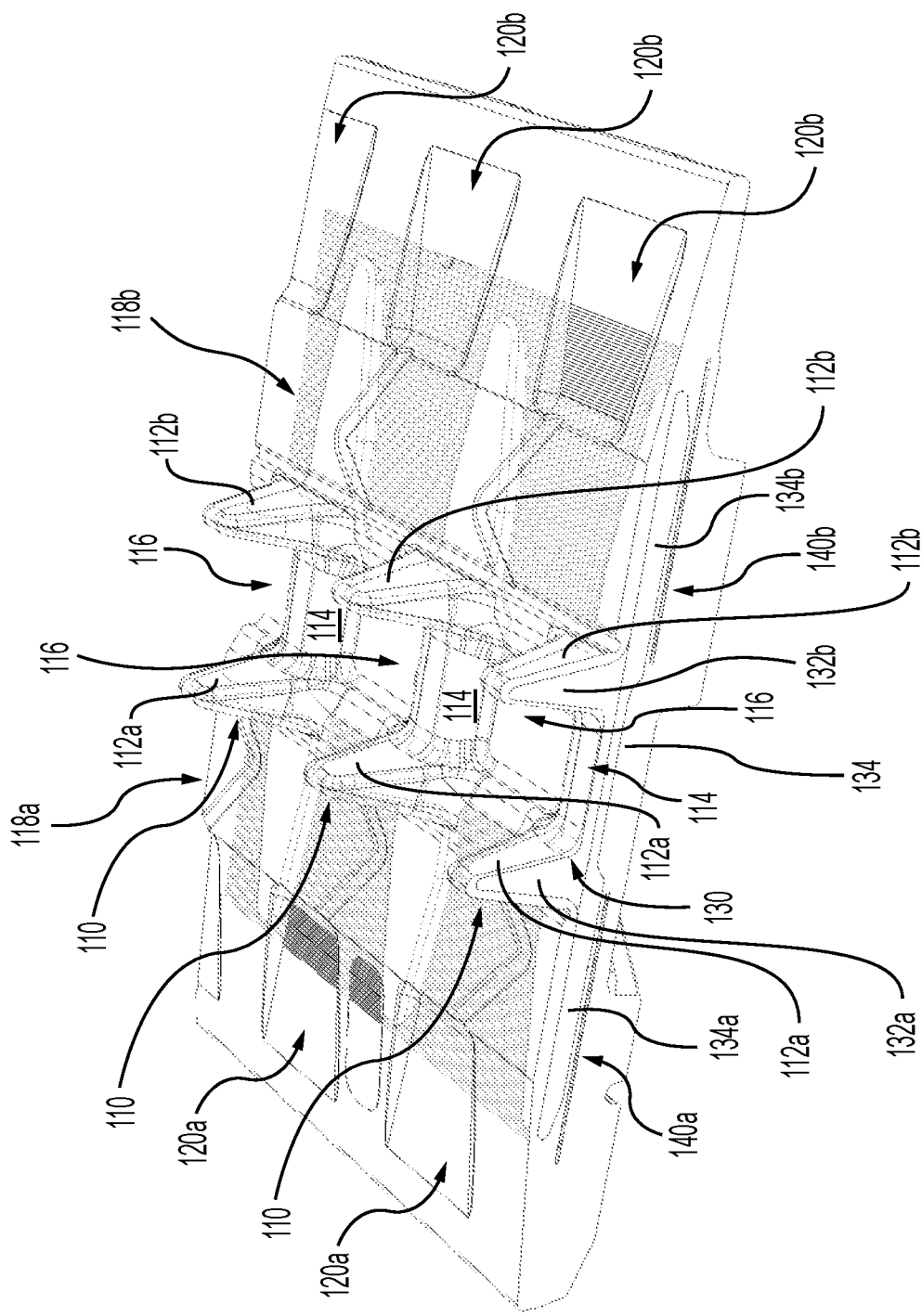
FIG. 10 is a perspective view taken from a top, rear, right side of the endless track portion of FIG. 9, with features of the endless track portion being shown in transparency.
Figure 11:
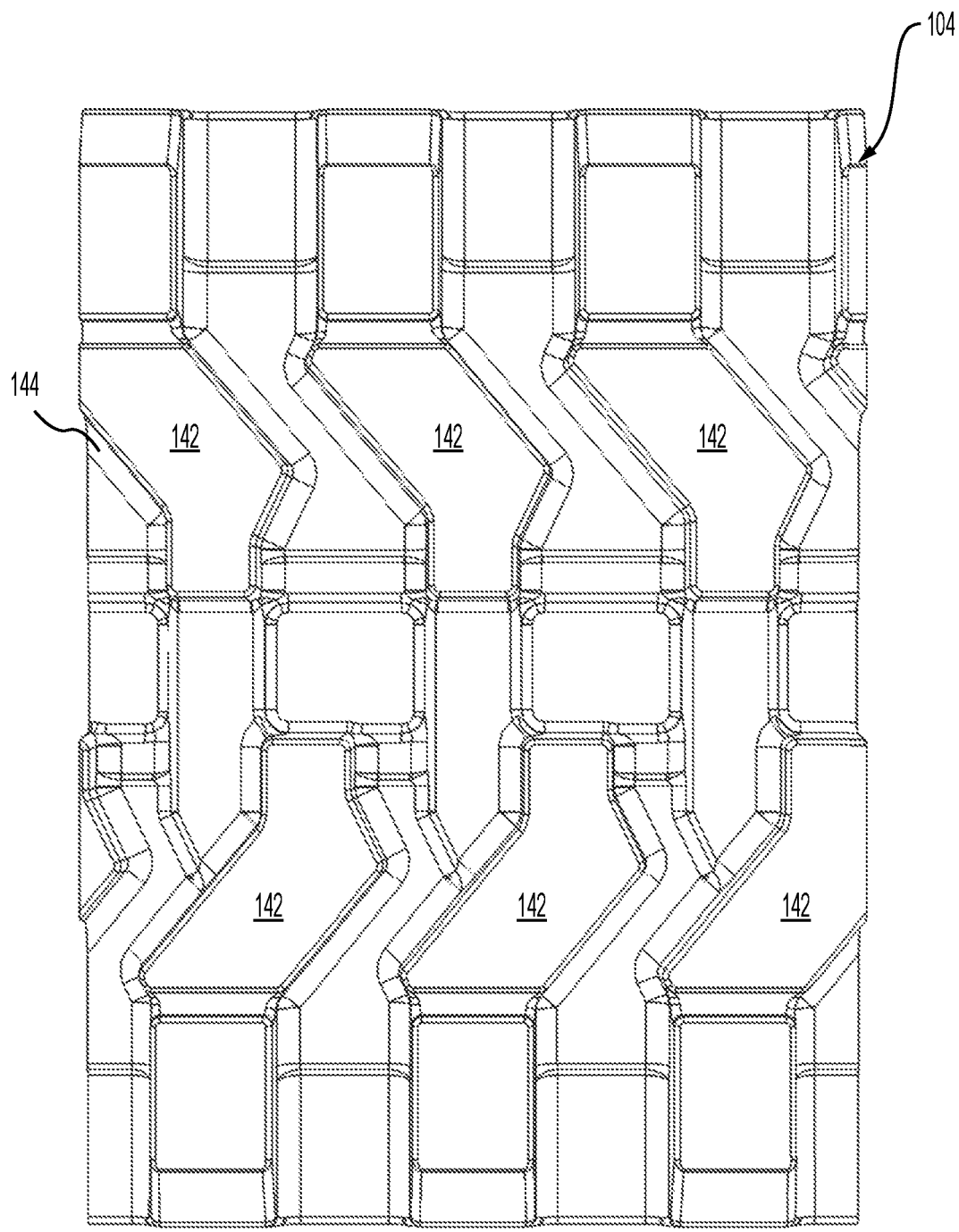
FIG. 11 is a bottom view of an outer surface of the endless track portion of FIG. 9.

Referring to FIGS. 9 to 11, the inner surface 102 of endless track 100 has a set of longitudinally spaced lugs 110 disposed generally centrally along the endless track 100. Each lug 110 has two laterally spaced projections 112a, 112b that project from the inner surface 102, away from the outer surface 104. Each lug 110 also has an intermediate portion 114 that connects the two laterally spaced projections 112a, 112b. The endless track 100 further defines a plurality of apertures 116. More precisely, each one of the plurality of apertures 116 extends longitudinally between two adjacent intermediate portions 114 such that the apertures 116 are longitudinally spaced from one another. The apertures 116 are configured to receive the teeth 62 of the sprocket wheel assembly 60. Thus, the teeth 62 are configured to engage with the intermediate portions 114 to drive the endless track 100. It is contemplated that in some embodiments, the apertures 116 could be omitted. In such embodiments, the sprocket wheel assembly 60 could be configured to engage with the projections 112a, 112b and/or with the intermediate portions 114 to drive the endless track 100. On each lateral side of the lugs 110, the inner surface 102 has wheel engaging sections 118a, 118b. The wheel engaging sections 118a, 118b, which extend longitudinally along the endless track 100, are generally flat. The wheel engaging sections 118a, 118b are configured to respectively engage with the wheels 82a, 82b of the leading idler wheel assembly 80 and to respectively engage with the side wheels 92a, 92b of the support wheel assemblies 90, 91. The intermediate wheel 94 of the support wheel assemblies 90, 91 and the wheel 87 of the trailing idler wheel assembly 85 are configured to engage a top surface of the intermediate portions 114. Still on the inner surface 102, laterally outwardly from the wheel engaging section 118a, the endless track 100 defines a plurality of longitudinally spaced recesses 120a. The recesses 120a are spaced such that of two adjacent recesses 120a, one recess 120a is disposed forwardly from the lateral portion 134a of the reinforcing member 130, and the other of the two adjacent recesses 120a is disposed rearwardly from the lateral portion 134a. Similarly, laterally outwardly from the wheel engaging section 118b, the endless track 100 defines a plurality of longitudinally spaced recesses 120b. The recesses 120b are spaced such that of two adjacent recesses 120b, one recess 120b is disposed forwardly from the lateral portion 134b of the reinforcing member 130, and the other of the two adjacent recesses 120b is disposed rearwardly from the lateral portion 134b. Thus, the recesses 120a are longitudinally aligned with the recesses 120b. In addition, the recesses 120a, 120b are aligned with apertures 116. In some embodiments, the recesses 120a could not be aligned with the recesses 120b. In other embodiments, the recesses 120a, 120b could not be aligned with the apertures 116. The recesses 120a, 120b and the apertures 116 reduce the amount of material required to manufacture the endless track 100. This reduction of material within the endless track 100 can, in some instances, help to reduce the rolling resistance of the endless track 100.

Referring to FIG. 10, the endless track 100 has a plurality of longitudinally spaced reinforcing members 130 embedded within the endless track 100. Each one of the reinforcing members 130 is aligned with one the lugs 110. As the reinforcing members 130 are all the same, only one will be described in detail herewith. The reinforcing member 130 has two side portions 132a, 132b and an intermediate portion 134. The side portion 132a is aligned with the projection 112a, the intermediate portion 134 is aligned with the intermediate portion 114 and the side portion 132b is aligned with the projection 112b. The reinforcing member 130 also has a lateral portion 134a that extends laterally outwardly from the side portion 132a, and a lateral portion 134b that extends laterally outwardly from the side portion 132b. Thus, the reinforcing members 130 are configured to have a shape similar to that of the lugs 110. The reinforcing members 130 can help to transmit motion of the sprocket wheel assembly 60 to the endless track 100. In addition, the reinforcing members 130 reinforce the lugs 110. As such, when the sprocket wheel assembly 60 engages the lugs 110 and/or when one or more of the leading and trailing idler wheel assemblies 80, 85 and the support wheel assemblies 90, 91 engage the inner surface 102 the endless track 100, the endless track 100 is less likely to tear and/or to be damaged. Thus, a life of the endless track 100 can be prolonged.

Still referring to FIG. 10, the endless track 100 also has two sets of reinforcing cables 140a, 140b disposed within the endless track 100. The two sets of reinforcing cables 140a, 140b extend longitudinally along the endless track 100, and further reinforce the endless track 100.

Referring to FIG. 11, the outer surface 104 of the endless track 100 has ridges 142 that form a tread 144 on the outer surface 104. It is contemplated that the tread 144 could vary in shape and dimension from one embodiment to another. In some embodiments, the tread 144 could depend on the type of vehicle on which the track system 50 is to be used and/or the type of ground surface on which the vehicle is destined to travel. Spacing between ridges 142 can, to some extent, vary depending on the ground surface on which the endless track 100 is to be used, on the type of vehicle on which the endless track 100 is to be used, etc. That being said, the spacing between ridges 142 of the endless track 100 is relatively large compared to spacing between ridges conventionally found in powersport track systems. This reduces the amount of material within the endless track 100. This reduction of material within the endless track 100 can, in some instances, help to reduce the rolling resistance of the endless track 100.

The endless track 100, by having the recesses 120a, 120b, the apertures 116, the reinforcing members 130 and the relatively large spacings between the ridges can assist in reducing rolling resistance while enhancing life of the endless track 100.

Referring back to FIGS. 2 to 8, the modular frame 150 will be described in greater detail. As mentioned above, the modular frame 150 includes the upper frame member 152 and the lower frame member 154. The various modular aspects of the modular frame 150 will be described in greater detail below.

Figure 6:
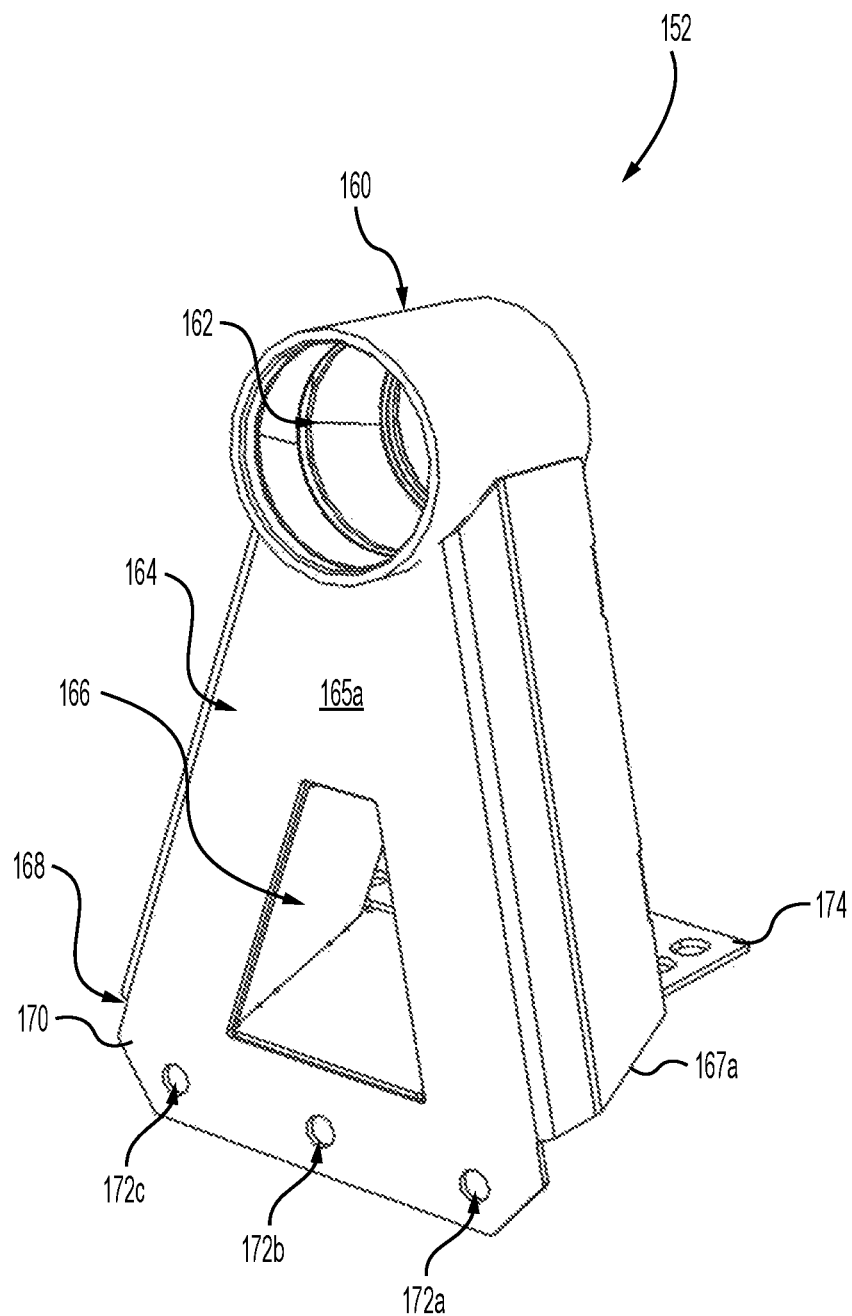
FIG. 6 is a perspective view taken from a top, front, right side of the upper frame member of the modular frame of FIG. 2.
Figure 7:
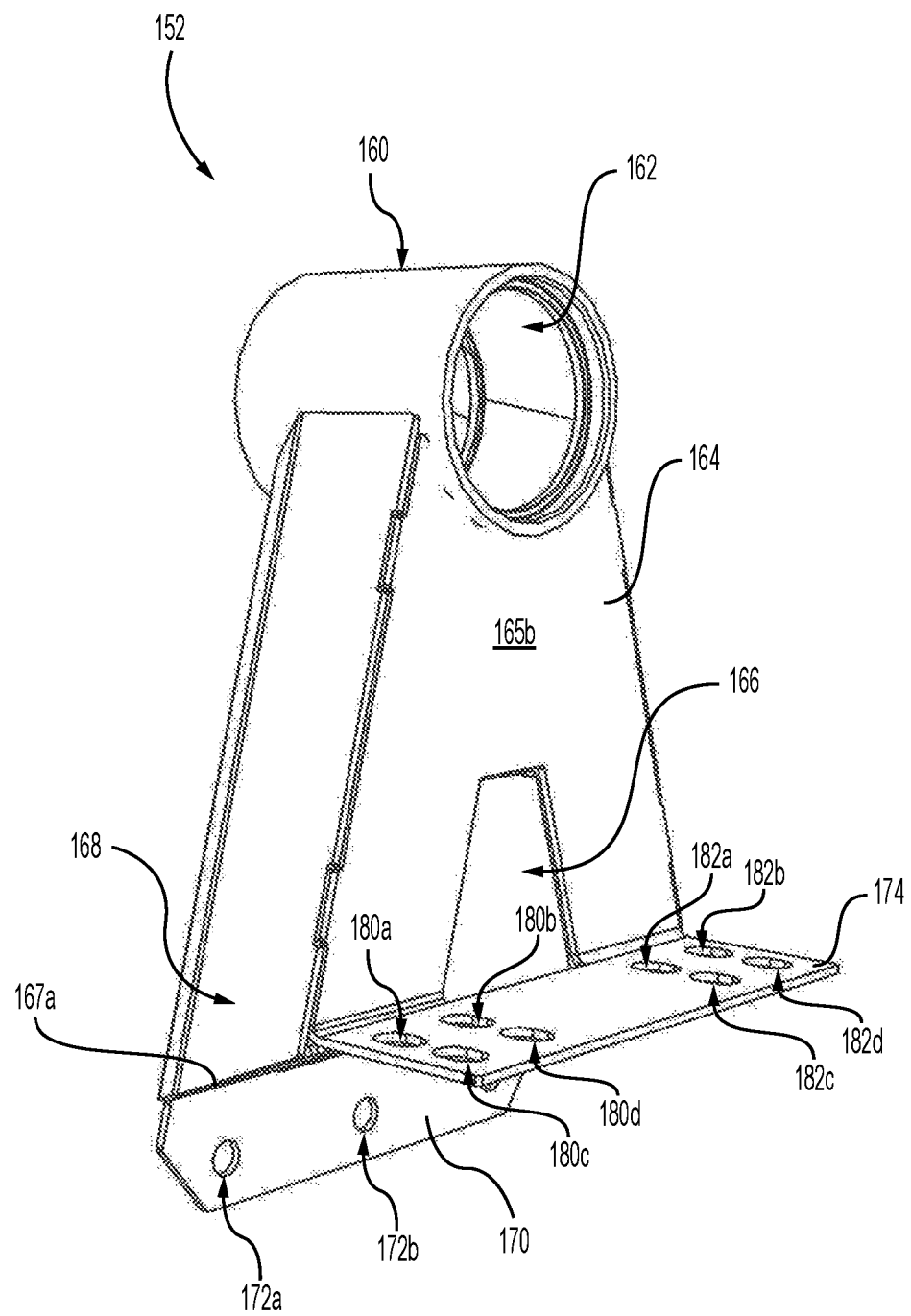
FIG. 7 is a perspective view taken from a top, front, left side of the upper frame member of FIG. 6.

Referring to FIGS. 6 and 7, the upper frame member 152 which is connectable to the axle of the vehicle 20, has an axle connecting portion 160 that defines an aperture 162 configured to receive a spindle 63 (shown in FIG. 1B), which is operatively connectable to the axle of the vehicle 20. The upper frame member 152 is configured to be connectable to either one of front and rear axles, on either a left side or a right side of the vehicle 20. This is advantageous in that manufacturing is facilitated, and in that the same upper frame member 152 can be connected to a number of different sides. The aperture 162 is configured to rotationally connect the sprocket wheel assembly 60 and/or the axle to the upper frame member 152. The upper frame member 152 has a middle portion 164 that extends downwardly from the axle connecting portion 160. An outer surface 165a of the middle portion 164 extends vertically lower than an inner surface 165b of the middle portion 164, such that the middle portion 164 has front and rear sloped edges 167a, 167b which extend in the lateral direction. As will be described in greater detail below, the front and rear sloped edges 167a, 167b are configured to connect to the lower frame member 154 (i.e., shape of the upper frame member 152 generally conforms to a shape of the lower frame member 154). The middle portion 164 defines an aperture 166 that extends from the outer surface 165a to the inner surface 165b. In this embodiment, the aperture 166 defines a trapezoidal shape extending through the upper member 152, however, in other embodiments, the aperture 166 could define another shape. The aperture 166, in part because the outer surface 165a extends vertically lower than the inner surface 165b, is tapered, such that the aperture 166 is larger at the outer surface 165a than at the inner surface 165b. The tapered configuration of the aperture 166 can help prevent accumulation of debris such as mud and/snow therein. In some embodiments, the aperture 166 could not be tapered. In other embodiments, the aperture 166 could be omitted. In some instances, the aperture 166 reduces the amount of material required to manufacture the modular frame 150.

The middle portion 164 has an upper connecting section 168 that includes an outer connecting segment 170, an inner connecting segment 174, and the front and rear sloped edges 167a, 167b. As will be described in greater detail below, the upper connecting section 168 is configured to connect to a lower connecting section 198 of the lower frame member 154.

The outer connecting segment 170 extends downwardly from a bottom of the outer surface 165a such that the outer connecting segment 170 extends below the front and rear sloped edges 167a, 167b. The outer connecting segment 170, defines three apertures 172a, 172b, 172c that are longitudinally spaced. As will be described in greater detail below, the three apertures 172a, 172b, 172c are configured to receive fasteners therein. In other embodiments, there could be more or fewer than three apertures. In other embodiments, the outer connecting segment 170 could be located elsewhere on the outer connecting segment 170.

The inner connecting segment 174 extends laterally inwardly (i.e., away from the outer surface 165a) from the inner surface 165b (best seen in FIG. 7). The inner connecting segment 174 defines a leading set of four apertures 180a, 180b, 180c, 180d and a trailing set of four apertures 182a, 182b, 182c, 182d. As will be described in greater detail below, the apertures 180a, 180b, 180c, 180d, 182a, 182b, 182c, 182d are configured to receive fasteners therein. In some embodiments, there could be only one set of apertures. In other embodiments, there could be three or more set of apertures. In yet other embodiments, there could be more or fewer than four apertures per set. In other embodiments, the inner connecting segment 174 could be located elsewhere on the outer connecting segment 170.

Figure 8:
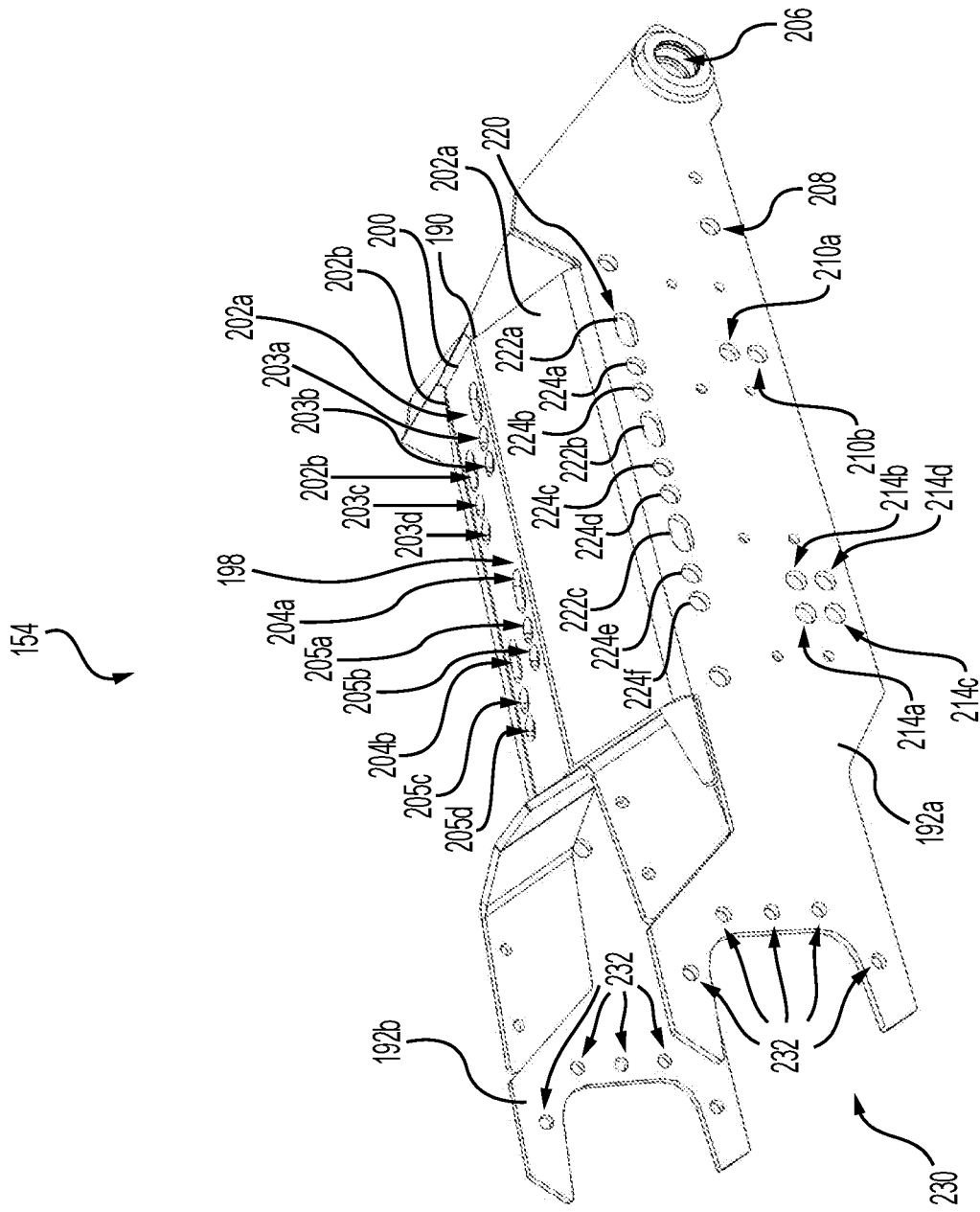
FIG. 8 is a perspective view taken from a top, rear, right side of a lower frame member of the modular frame of FIG. 2.

Referring to FIG. 8, the lower frame member 154 has an upper segment 190 and two lateral segments 192a, 192b. The upper segment 190 and the two lateral segments 192a, 192b are integral, though it is contemplated that in other embodiments, the upper and lateral segments 190, 192a, 192b could be separate parts that are removably connected to one another. In some embodiments, the lower frame member 154 could have more than the segments mentioned hereabove.

The lower frame member 154 includes the lower connecting section 198 that is configured to connect with the upper connecting portion 168. The lower connecting section 198 includes the upper segment 190 and an upper area of one of the lateral segments 192a, 192b.

The upper segment 190 has a flat middle portion 200 (i.e., generally horizontal) and two sloped portions 202a, 202b that extend downwardly from the flat middle portion 200. The sloped configuration of the upper segment 190 can help prevent accumulation of debris such as mud and/snow thereon. Thus, the upper segment 190 is configured to cause the debris to slide off.

The flat middle portion 200 defines a leading set of two leading slots 202a, 202b and four leading apertures 203a, 203b, 203c, 203d as well as a trailing set of two trailing slots 204a, 204b and four trailing apertures 205a, 205b, 205c, 205d. The leading slot 202a and the leading apertures 203a, 203b are laterally spaced, and longitudinally staggered relative to the leading slot 202b and the leading apertures 203c, 203d. Similarly, the trailing slot 204a and the trailing apertures 205a, 205b are laterally spaced, and longitudinally staggered relative to the trailing slot 204b and the trailing apertures 205c, 205d. As will be described in greater detail below, the leading and trailing slots 202a, 202b, 204a, 204b and the leading and trailing apertures 203a, 203b, 203c, 203d, 205a, 205b, 205c, 205d are configured to receive fasteners therein.

Still referring to FIG. 8, the two lateral segments 192a, 192b are mirror images of one another. As such, only the lateral segment 192a will be described in detail herewith.

At a forward end of the lateral segment 192, the lateral segment 192 extends downwardly at an angle, and defines a forward tensioner aperture 206. As will be described in greater detail below, the forward tensioner aperture 206 is configured to receive a fastener therein and will enable a pivotal connection between the tensioner 270 and the modular frame 150.

Longitudinally rearward to the forward tensioner aperture 206, the lateral segment 192 defines a rearward tensioner aperture 208. As will be described in greater detail below, a resilient portion 272 of the tensioner 270 can be connected to the modular frame 150 through the rearward tensioner aperture 208.

Longitudinally rearward to the trailing tensioner aperture 208, the lateral segment 192 defines two leading support wheel apertures 210a, 210b. In other embodiments, there could be more or fewer than two leading support wheel apertures 210a, 210b. The two leading supper wheel apertures 210a, 210b are longitudinally aligned, and vertically spaced, with the leading support wheel aperture 210a being above the leading support wheel aperture 210b. It is contemplated that in some embodiments, the two leading support wheel apertures 210a, 210b could be longitudinally spaced and/or vertically aligned. The leading support wheel apertures 210a, 210b are configured to receive a fastener 212 therein, where the fastener 212 connects to the support wheel assembly 90. Thus, the support wheel assembly 90 can connect to the modular frame 150 through one of the leading support wheel apertures 210a, 210b. In some embodiments, the leading support wheel apertures 210a, 210b could be configured to receive the axle 96 of the support wheel assembly 90 therein.

Longitudinally rearward to the two leading support wheel apertures 210a, 210b, the lateral segment 192a defines four trailing support wheel apertures 214a, 214b, 214c, 214d. It is contemplated that in some embodiments, there could be more or fewer than four trailing support wheel apertures 214a, 214b, 214c, 214d. The trailing support wheel apertures 214a, 214b, 214c, 214d are configured to receive a fastener 216 therein, where the fastener 216 connects to the support wheel assembly 91. Thus, the support wheel assembly 91 can connect to the modular frame 150 through one of the trailing support wheel apertures 214a, 214b, 214c, 214d. In some embodiments, the trailing support wheel apertures 214a, 214b, 214c, 214d could be configured to receive the axle 96 of the support wheel assembly 91 therein.

Still referring to FIG. 8, the lateral segment 192a further defines, towards a top, middle portion thereof, a set of apertures 220. The set of apertures 220 includes a leading slot 222a, two leading apertures 224a, 224b, an intermediate slot 222b, two intermediate apertures 224c, 224d, a trailing slot 222c and two trailing apertures 222e, 222f. As will be described in greater detail below, the leading, intermediate and trailing slots 222a, 222b, 222c and the leading intermediate and trailing apertures 224a, 224b, 224c, 224d, 224e, 224f are configured to receive fasteners therein, thereby enabling connection of the lower frame member 154 with the upper frame member 152.

The lateral segment 192a defines, towards a rear thereof a recess 230 and five apertures 232, where the five apertures 232 surround the recess 230. The recess 230 is configured to receive the mounting plate 250c and a connecting member 240 (shown in FIGS. 1 and 2) therein. As mentioned above, the trailing idler wheel assembly 85 is connected to the modular frame 150 by the mounting plates 250c, 250d. In some embodiments, the trailing idler wheel assembly 85 could be connectable to the modular frame 150 without the mounting plates 250c, 250d, such as for instance, with fasteners.

As mentioned above, an overall shape of the upper connecting section 168 generally corresponds to an overall shape of the lower connecting section 198. In part due to the corresponding shapes of the upper and lower connecting sections 168, 198, a modular connection between the upper and lower frame members 152, 154 will be described. This, as will be described below, can facilitate replacement of the lower frame member 154 by another lower frame member that confers different properties.

Figure 12:
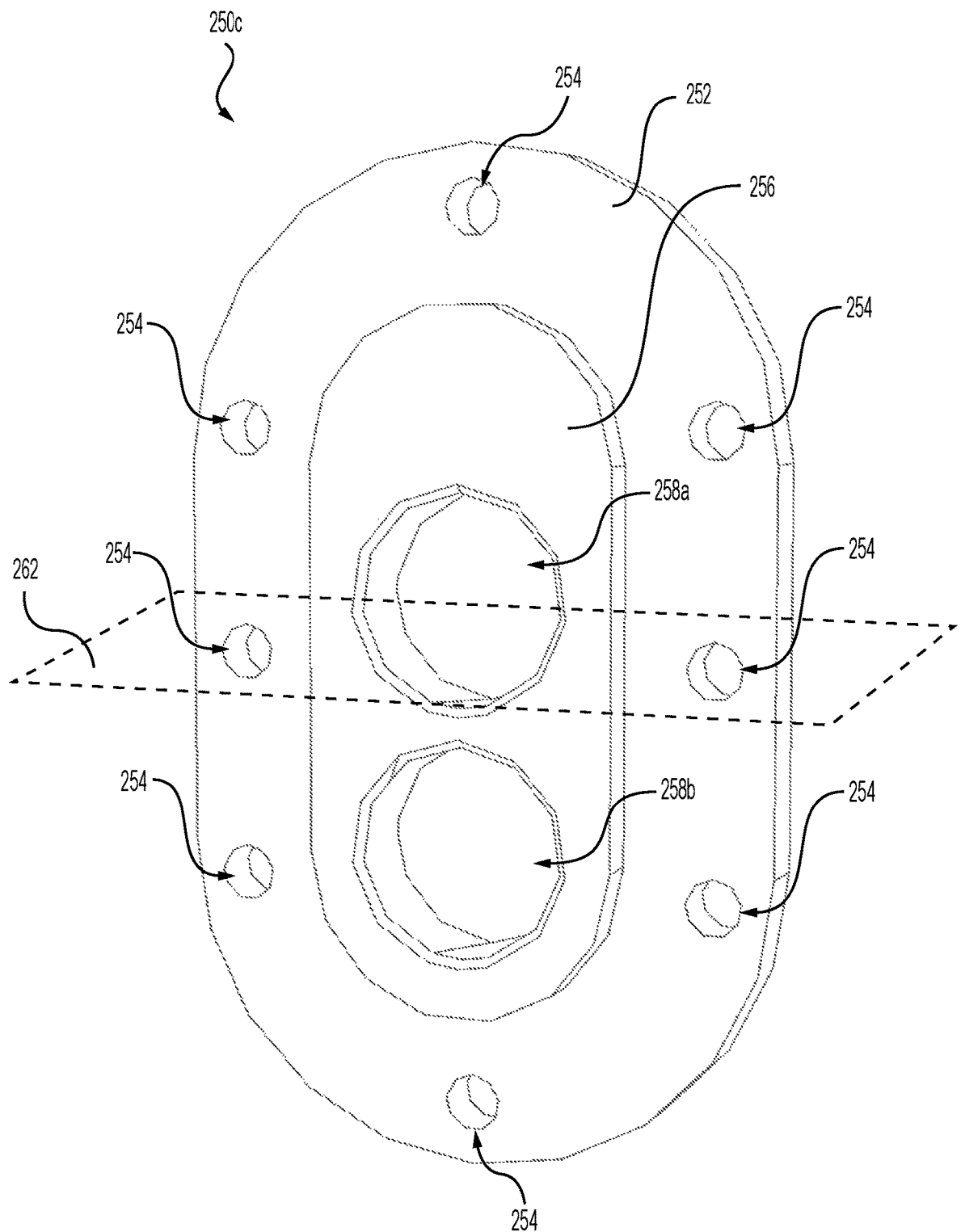
FIG. 12 is a perspective view taken from a top, front, right side of a mounting plate of the track system of FIG. 1B.

Referring to FIG. 12, the mounting plates 250a, 250b, 250c, 250d will now be described. The mounting plates 250a, 250b are configured to mount the front idler wheel assembly 80 to the modular frame 150, and the mounting plates 250c, 250d are configured to mount the rear idler wheel assembly 85 to the modular frame 150. As the mounting plates 250a, 250b, 250c, 250d are the same, only the mounting plate 250c will be described in detail herewith. The mounting plate 250c has a base portion 252. The base portion 252 is an elliptical base portion 252. It is understood that in other embodiments, the base portion 252 could have another shape. The elliptical base portion defines a plurality of fastening apertures 254. More precisely, the elliptical base portion 252 defines eight fastening apertures 254. It is contemplated that in other embodiments, there could be more or less than eight fastening apertures 254. The base portion 252 has a projection 256 that defines two vertically spaced connecting apertures 258a, 258b. The projection 256 is an elliptical projection 256. It is contemplated that in other embodiments, the projection 256 could have another shape, such that, for instance and without restriction, the projection 256 could be a rectangular projection. It is contemplated that in some embodiments, there could be three or more connecting apertures 258a, 258b. The connecting apertures 258a, 258b are configured to receive a fastener therein, wherein the fastener connects with the trailing idler wheel assembly 85. In some embodiments, the connecting apertures 258a, 258b could be configured to receive the axle 89 of the trailing idler wheel assembly 85. A distance between a top edge of the elliptical projection 256 and a top of the connecting aperture 258a is greater than a distance between a bottom edge of the elliptical projection 256 and a bottom of the connecting aperture 258b. As such, the mounting plate 250c is asymmetrical about a horizontal plane 262. The mounting plate 250c is removably connectable to the lower frame member 154 in two configurations: a first configuration where the connecting aperture 258a is above the connecting aperture 258b and a second configuration where the connecting aperture 258a is below the connecting aperture 258b. Thus, the asymmetry of the mounting plate 250c enables the trailing idler wheel assembly 85 to be connectable to the modular frame 150 in four different configurations. When the mounting plate 250c is received in the recess 230, the elliptical projection 256 is flush with lateral segment 192a, and the five apertures 232 are aligned with five of the eight fastening apertures 254.

The connecting member 240 can facilitate the connection of the rear idler wheel assembly 85 to the modular frame 150. More precisely, the rear idler wheel assembly 85 can be connected to the mounting plates 250c, 250d prior to the mounting plates 250c, 250d being connected to, respectively, the right and left lateral segments 192a, 192b. Thus, after the rear idler wheel assembly 85 is connected to the mounting plates 250c, 250d, the rear idler wheel assembly 85 and the mounting plates 250c 250d assembly could be received in the recesses 230 of the left and right lateral segments 192a, 192b. This can be useful when the axle 89 of the idler wheel assembly is not suitable for insertion (i.e., too long) between the left and right lateral segments 192a, 192b of the lower frame member 154.

In some embodiments where the connecting member 240 is omitted and the axle 89 is not suitable for insertion (i.e., too long) between the left and right lateral segments 192a, 192b, the axle 89, and thus the rear idler wheel assembly 85 could be connected to the lower frame member 154 as described hereafter. The axle 89 is received in the recesses 230 of the left and right lateral segments 192a, 192b. The axle 89 is then approximately positioned at the desired position within the recesses 230. The mounting plate 250c is received in the recess 230a and the axle 89 is received in one of the connecting apertures 258a, 258b. Then, the mounting plate 250d is received in the recesses 230, and the axle 89 is received in the other one of the connecting apertures 258a, 258b. The axle 89 being already received in one of the connecting apertures 258a, 258b of the mounting plate 250c provides the clearance required to insert the axle 89 in the other one of the connecting apertures 258a, 258b of the mounting plate 250d. It is understood that the axle 89 could be received in the mounting plate 250d before the mounting plate 250c.

In other embodiments where the axle 89 is configured to be suitable for insertion between the left and right lateral segments 192a, 192b of the lower frame member 154, the connecting member 240 could be omitted.

Figure 13A:
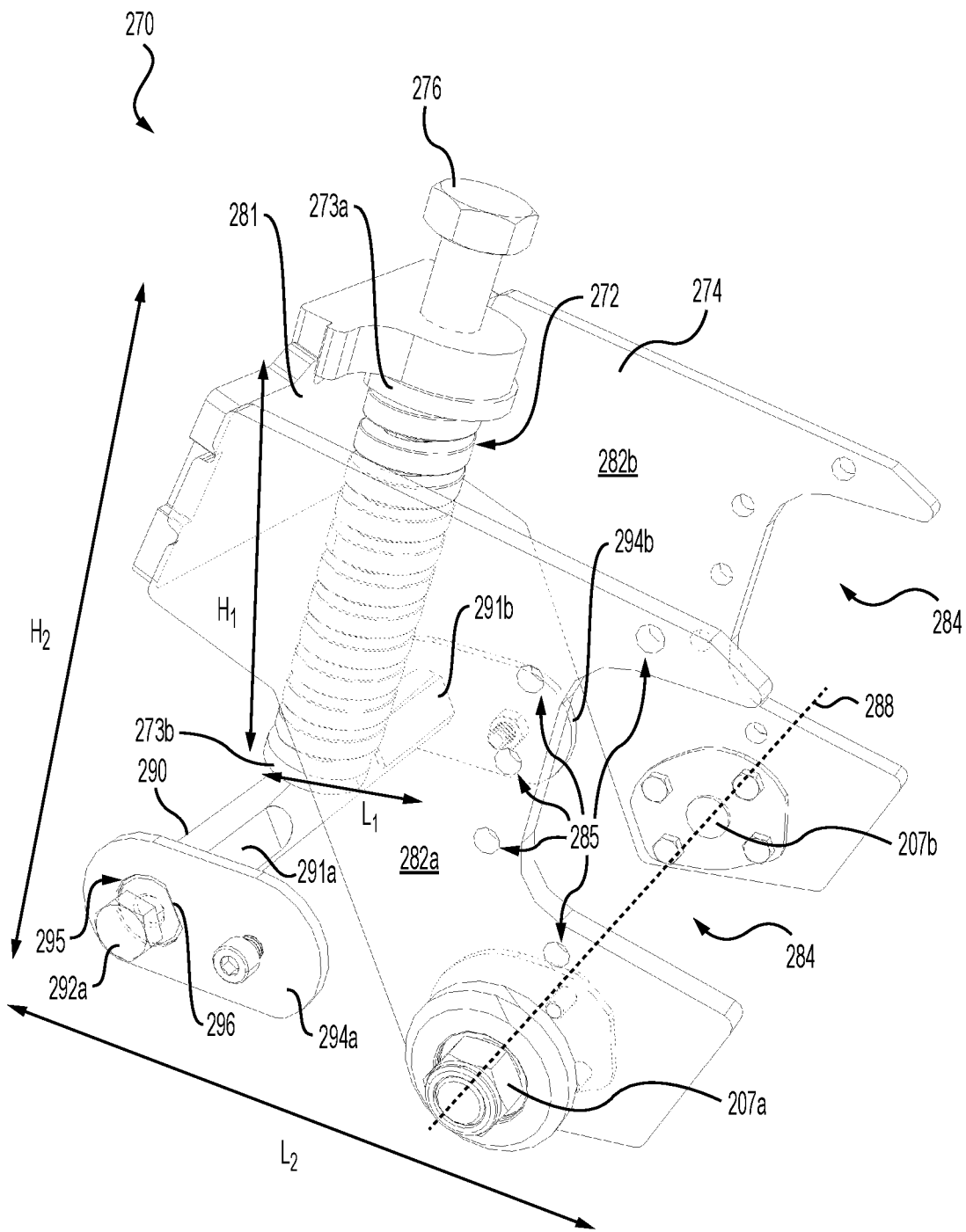
FIG. 13A is a perspective view taken from a top, front, right side of a tensioner of the track system of FIG. 1B, with features of the tensioner being shown in transparency.
Figure 13B:
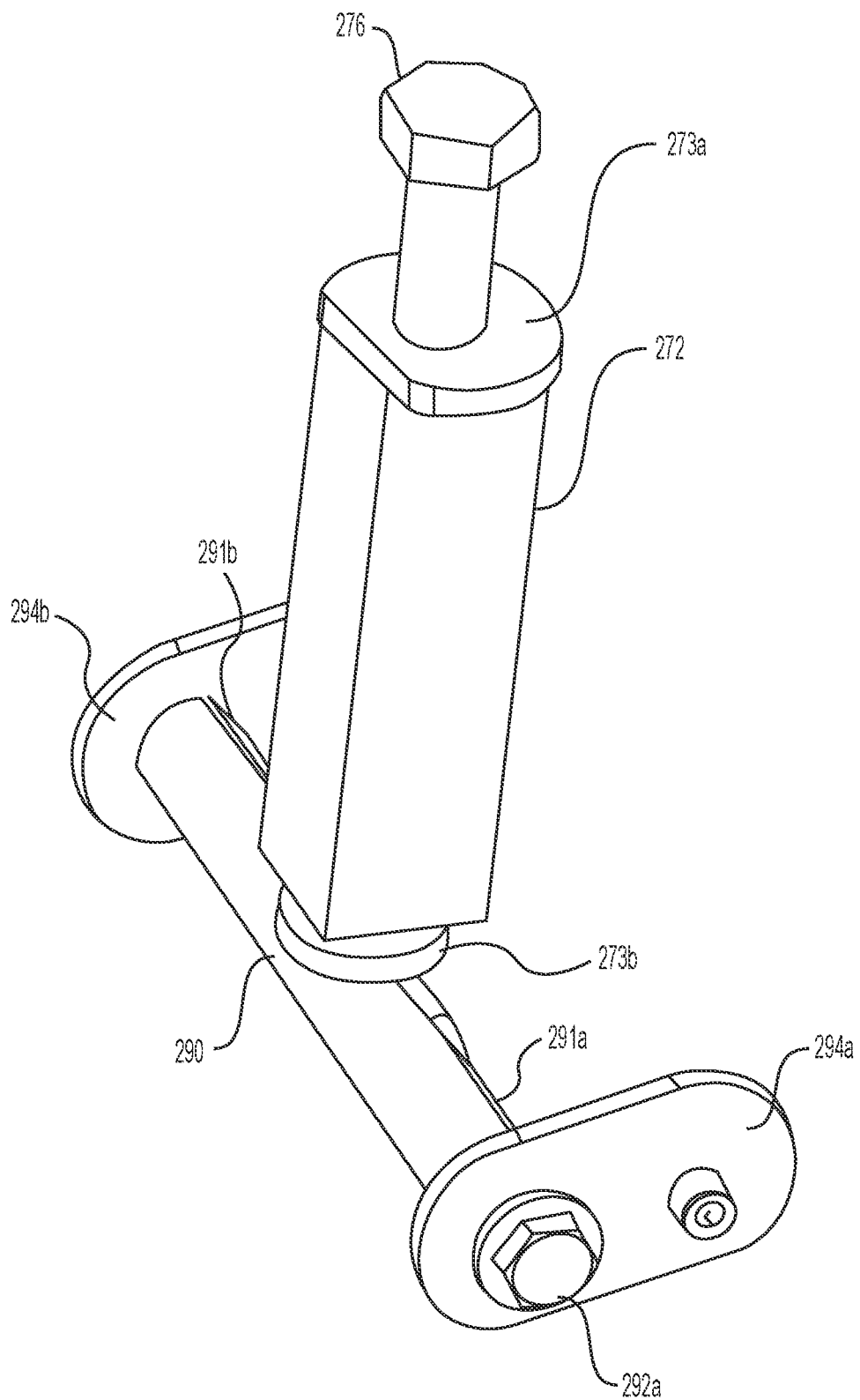
FIG. 13B is a perspective view taken from a top, front, right side of an alternate embodiment of the tensioner of FIG. 13A, with some features of the tensioner being omitted.

Referring now to FIGS. 13A and 13B, and turning back toward the forward end of the lower frame member 154, the tensioner 270 is connected to the lower frame member 154. The tensioner 270 includes the resilient portion 272, a wheel connecting portion 274 and a fastener 276.

Focusing first on the wheel connecting portion 274 which is pivotally connected to the lower frame member 154, the wheel connecting portion 274 has an intermediate segment 281 and two lateral segments 282a, 282b. The wheel connecting portion 274 is one integral portion. It is contemplated, however, that in some embodiments, the wheel connecting portions could be made of two or more segments connected with one another.

The intermediate segment 281 is configured to connect to a top of the resilient portion 272 and to receive the fastener 276.

The two lateral segments 282a, 282b are mirror images of one another, and thus only the lateral segment 282a will be described herewith. The lateral segment 282a defines a recess 284 which is configured to receive the mounting plate 250a and a connecting member 241 (similar to connecting member 240) therein, and five apertures 285 surrounding the recess 284. The lateral segment 282a also defines an aperture 286 that is configured to align with the forward tensioner aperture 206 when the wheel connecting portion 274 is connected to the lower frame member 154.

The lateral segments 282a, 282b are configured to pivotally connect to the lower frame member 154. More precisely, a fastener 207a is received through the forward tensioner aperture 206 of the lateral segment 192a and the aperture 286 of the lateral segment 282a, and a fastener 207b is received through the forward tensioner aperture 206 of the lateral segment 192b and the aperture 286 of the lateral segment 282b, such that the wheel connecting portion 274 is configured to pivot about pivot axis 288, where the pivot axis 288 passes through the forward tensioner aperture 206 and the aperture 286 when the tensioner 270 is connected to the lower frame member 154.

Still referring to FIGS. 13A and 13B, the resilient portion 272 is connected to upper and lower plates 273a, 273b. It is contemplated that in other embodiments, as shown in FIG. 13B, the resilient portion 272 could include a polymeric member 272. In some embodiments, the resilient portion 272 could include two or more polymeric members 272. In other embodiments, the resilient portion 272 could include a spring and a polymeric member. The upper plate 273a is connected to the intermediate segment 281 by the fastener 276, and the lower plate 273b is connected to a shaft 290. The resilient portion 272 is generally at a center of the intermediate segment 281, such that the resilient portion 272 is laterally disposed between the wheels 82a, 82b of the front idler wheel assembly 80 when the front idler wheel assembly 80 is connected to the modular frame 150. The shaft 290 is fixedly connected to the lateral segments 192a, 192b of the lower frame member 154 by fasteners 292a, 292b. The shaft 290, which has two straight edges 291a, 291b, is also connected to positioning members 294a, 294b. The positioning members 294a, 294b also, respectively, connect to the lateral segments 192a, 192b and are configured to, as will be described in greater detail below, position the shaft 290 depending on a size of the wheels 82a, 82b of the front idler wheel assembly 80 so that the upper and lower plates 273a, 273b remain generally parallel, as well to provide stability to the shaft 290 and the resilient portion 272. As shown in FIGS. 13A and 13B, the resilient portion 272 is oriented generally upwardly. The resilient portion 272 is also oriented away from the axle 84 of the leading idler wheel assembly 80. More precisely, the resilient portion 272 is oriented about 80 degrees away from the axle 84. In some embodiments, the resilient portion 272 could be oriented about 60 degrees away from the axle 84. In other embodiments, the resilient portion 272 could be oriented about 45 degrees away from the axle 84.

The resilient portion 272 has a height H1 that defines a vertical resilient portion footprint and a length L1 that defines a longitudinal resilient portion footprint. As best seen in FIG. 13A, the vertical resilient portion footprint is greater than the longitudinal resilient portion footprint. A height over length ratio of the resilient portion 274 is about 4 to 1. It is contemplated that in some embodiments, the height over length ratio of the resilient portion 274 could be about 5 to 1, about 6 to 1, about 7 to 1, about 7.5 to 1, or about 8 to 1. In yet other embodiments, the height over length ratio of the resilient portion 274 could be about 3 to 1, about 2 to 1, or about 1.5 to 1.

The positioning members 294a, 294b being similar components, only the positioning member 294a will be described herewith. The positioning member 294a defines an aperture 295 having a guiding edge 296. The aperture 295 is configured to receive a portion of the shaft 290 therein. Because of the guiding edge 296 and the straight edge 291a, the shaft 290 is positioned in an orientation where the upper and lower plates 273a, 273b are generally parallel. Thus, the spring 292 and the tensioner 270 are positioned in that orientation. The orientation of the tensioner 270 depends on a size of the wheels 82a, 82b. If the wheels 82a, 82b are to be replaced with larger wheels, then the positioning members 294a, 294b are also replaced with different positioning members where the guiding edge 296 is slightly shifted to adapt to the larger wheel size. The positioning members 294a, 294b can be easily manufactured. Thus, the positioning members 294a, 294b, which are easy to replace, assist in keeping the lower frame member 154 generic.

The tensioner 270 has a height H2 that defines a vertical tensioner footprint and a length L2 that defines a longitudinal tensioner footprint. As best seen in FIG. 13A, the vertical tensioner footprint is greater than the longitudinal tensioner footprint. A height over length ratio of the tensioner 270 is about 2 to 1. It is contemplated that in some embodiments, the height over length ratio of the tensioner 270 could be about 3 to 1, about 3.5 to 1, or about 4 to 1. In yet other embodiments, the height over length ratio of the tensioner 270 could be about 1.5 to 1, or about 1.25 to 1.

The tensioner 270 can adjust tension within the endless track 100. In some embodiments, the tensioner 270 could be adjusted by fastening or unfastening the fastener 276. Fastening or unfastening the fastener 276 results in the upper plate 273a moving towards or away from the lower plate 273b.

When tension in the endless track 100 is to be increased, the tensioner 270 is adjusted by fastening the fastener 276, thereby moving the upper plate 273a towards the lower plate 273b, such that the wheel connecting portion 274 pivots about the pivot axis 288. The pivotal motion of the wheel connecting portion 274 is such that the leading idler wheel assembly 80 moves away from the modular frame 150. Thus, forces applied on the endless track 100 by the leading idler wheel assembly 80 increase, which results in increasing the tension within the endless track 100.

When tension in the endless track 100 is to be reduced, the tensioner 270 is adjusted by unfastening, to some extent, the fastener 276, thereby moving the upper plate 273a away from the lower plate 273b, such that the wheel connecting portion 274 pivots about the pivot axis 288. The pivotal motion of the wheel connecting portion 274 is such that the leading idler wheel assembly 80 moves toward the modular frame 150. Thus, forces applied on the endless track 100 by the leading idler wheel assembly 80 decrease, which results in decreasing the tension within the endless track 100.

It will be appreciated that the pivotal motion of the wheel connecting portion 274 along with the orientation of the resilient portion 272 minimizes a footprint of the tensioner 270.

As opposed to conventional tensioners that are oriented horizontally, the tensioner 270 is oriented generally vertically. This orientation reduces a footprint the tensioner 270, which is useful, inter alia, for a track system having, as described herein, a modular frame. A reduced footprint is also useful for track systems with limited longitudinal space. Indeed, in some embodiments, the track system 50 could be configured to replace a wheel of a vehicle. It can be advantageous for a diameter of the sprocket wheel assembly 60 to be sized as close as possible to the diameter of the wheel being replaced to minimize the differential between the original wheel rotational speed and the sprocket wheel rotational speed. In such cases, the size of the sprocket wheel assembly 60 could prevent using a horizontally oriented tensioner or a tensioner that requires significant space (i.e., longitudinal footprint).

In addition, the resilient portion 272 being disposed between the two wheels 82a, 82b avoids the need to have additional protective members to protect the resilient portion 272 from various elements (e.g., debris, snow, etc.), which further reduces longitudinal space required for the tensioner 270. Furthermore, being that the resilient portion 272 is generally oriented vertically, accumulation of elements (e.g., debris, snow, etc.) thereon can be less likely than if it were oriented horizontally.

Descriptions of various modular aspects of the present technology will now be provided.

In one modular aspect of the present technology, the lower frame member 154 is connectable to the upper frame member 152 in various configurations (i.e., the modular frame 150 has various configurations). In the present embodiment, the lower frame member 154 is connectable to the upper frame member 152 in a large number of configurations (due to the slots, as will be described below). It is contemplated that in other embodiments, the lower frame member 154 could be connectable to the upper frame member 152 in a different number of configurations. Though it is hereby mentioned that the lower frame member 154 is adjusted/connected to the upper frame member 152 at various positions relative to one another, it is understood that that is analogous to the upper frame member 152 being adjusted/connected to the lower frame member 154 at various positions relative to one another.

Referring back to FIGS. 3, 5A and 6 to 8, a description of a leading configuration of the modular frame 150, where the lower frame member 154 is at forwardmost position relative to the upper frame member 152, will be described.

The lower frame member 154 is removably connected to the upper frame member 152 by removable fasteners 300, 302, 304, 310, 312, 314, 316. The removable fasteners 300, 302, 304, 310, 312, 314, 316 are bolts. It is contemplated, however, that the fasteners 300, 302, 304, 310, 312, 314, 316 could be other selectively removable fasteners such as quick-action fasteners, clamps, tie-downs, etc.

The lower frame member 154 is positioned such that the lower connecting section 198 engages the upper connecting section 168. More precisely, the outer connecting segment 170 is configured to engage the upper area of the lateral segment 192a and the inner connecting segment 174 is configured to engage the flat middle portion 200 of the upper segment 190. The front and rear sloped edges 167a, 167b are configured to engage the sloped portion 202a of the upper segment 190.

Focusing on the outer connecting segment 170, the aperture 172a is aligned with the leading aperture 224b of the set of apertures 220, and the fastener 300 is received in the aperture 172a and the leading aperture 224b. The aperture 172b is aligned with the intermediate aperture 224d of the set of apertures 220, and the fastener 302 is received in the aperture 172b and the intermediate aperture 224d. The aperture 172c is aligned with the trailing aperture 224f of the set of apertures 220, and the fastener 304 is received in the aperture 172c and the trailing aperture 224d. The fasteners 300, 302, 304 connect into a connecting plate 309 (shown in FIG. 4).

Focusing now on the inner connecting segment 174, the leading aperture 180a is aligned with the leading aperture 203b, and the fastener 310 is received the leading aperture 180a and the leading aperture 203b. The leading aperture 180d is aligned with the leading aperture 203d, and the fastener 312 is received the leading aperture 180d and the leading aperture 203d. The trailing aperture 182a is aligned with the trailing aperture 205b, and the fastener 314 is received in the trailing aperture 182a and the trailing aperture 205b. The trailing aperture 182d is aligned with the trailing aperture 205d, and the fastener 316 is received in the trailing aperture 182d and the trailing aperture 205d.

The fasteners 300, 302, 304, 310, 312, 314, 316 are configured to securely connect the lower frame member 154 to connect to the upper frame member 152.

Also, in the leading configuration, the leading idler wheel assembly 80 is connected to the mounting plates 250a, 250b through the connecting apertures 258a (where the connecting aperture 258a is above the connecting aperture 258b) by fasteners 320a, 320b, the support wheel assembly 90 is connected to the lower frame member 154 through the leading support wheel aperture 210a by the fastener 212, the support wheel assembly 91 is connected to the lower frame member 154 through the trailing support wheel aperture 214a by the fastener 216, and the trailing idler wheel assembly 85 is connected to the mounting plates 250c, 250d through the connecting apertures 258b (where the connecting aperture 258b is below the connecting aperture 258a) by fasteners 322a, 322b.

In the leading configuration, as a result of the position of the lower frame member 154 relative to the upper frame member 152, the modular frame 150 induces a leading ground contact area. The leading ground contact area has a given length, a width and given position relative to the vehicle 20. It is understood that the position of the lower frame member 154 relative to the upper frame member 152 induces other leading properties such as a leading approach angle and a leading departure angle.

After removing the fasteners 300, 302, 304, 310, 312, 314, 316 the lower frame member 154 can be moved rearwardly relative to the upper frame member 152, such the lower frame member 154 could be moved to an intermediate position such that the modular frame 150 would be in an intermediate configuration or could be moved at a rearward position such that the modular frame 150 would be in the rearward configuration.

Figure 5A:
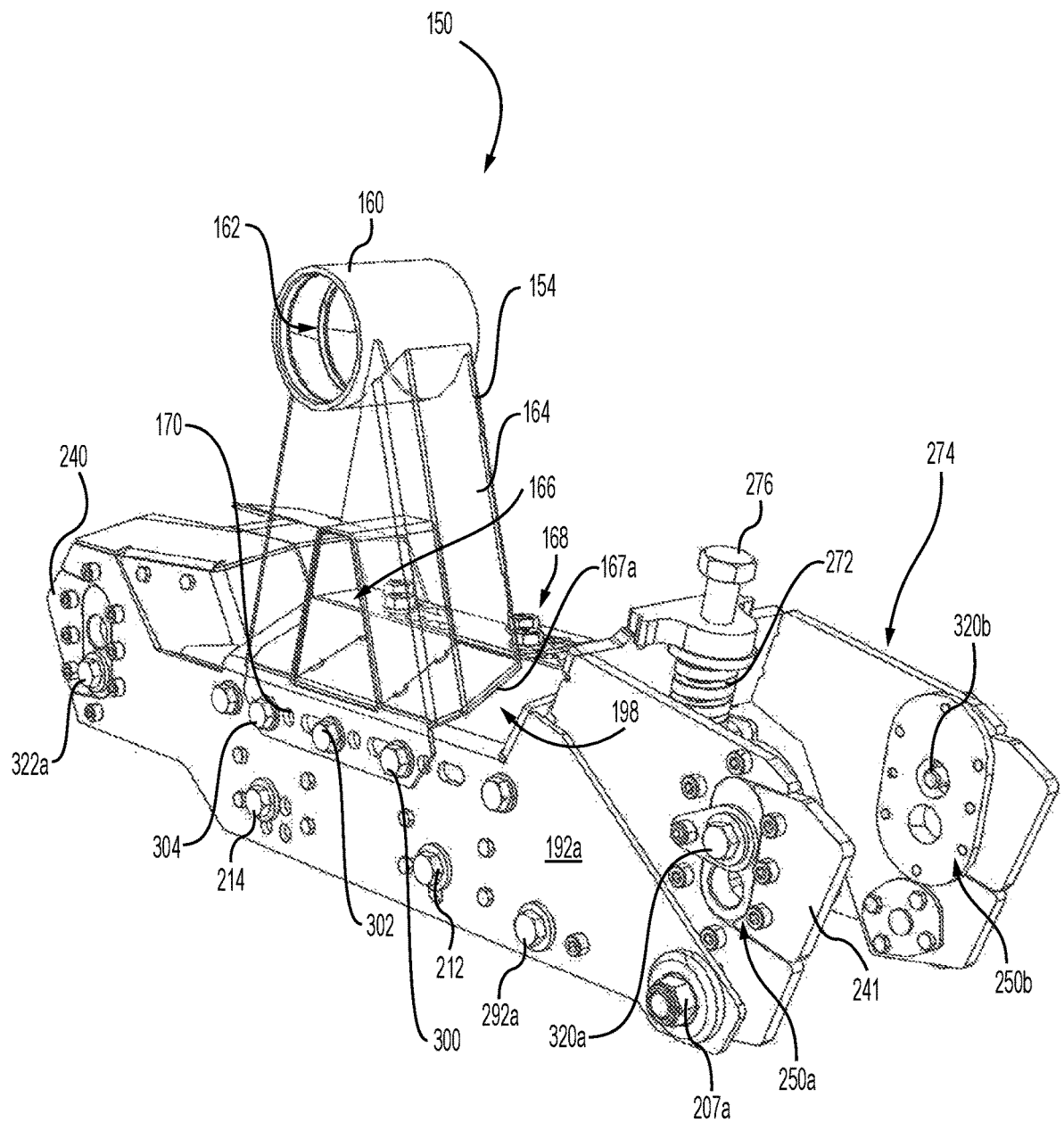
FIG. 5A is a perspective view taken from a top, front, right side of the modular frame of FIG. 2, with an upper frame member being shown in transparency and them modular frame being in a leading configuration.
Figure 5B:
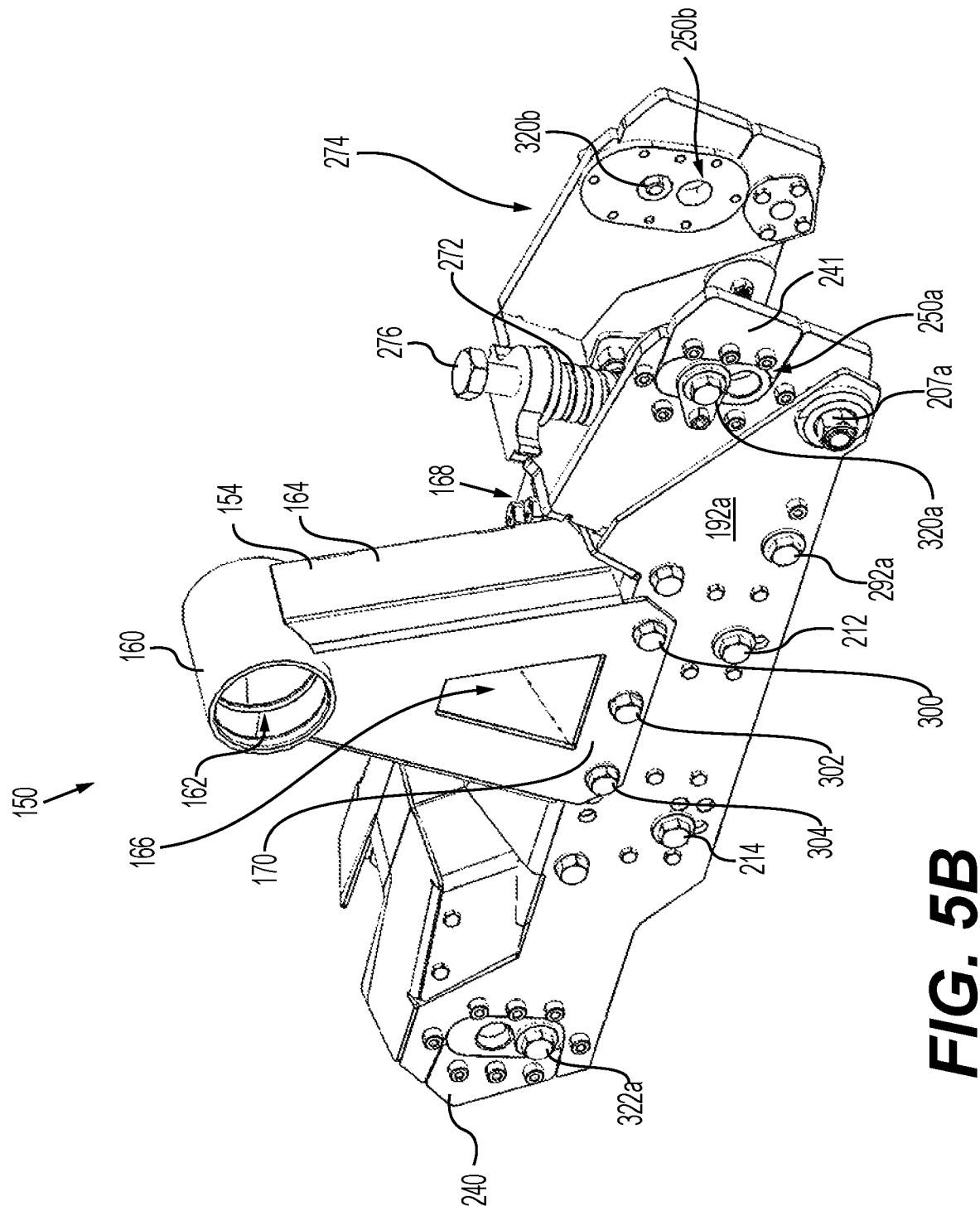
FIG. 5B is a perspective view taken from a top, front, right side of the modular frame of FIG. 2, with the modular frame being in a rearward configuration.

As shown in FIG. 5B, when the modular frame 150 is in the rearward configuration, focusing on the outer connecting segment 170, the aperture 172a is aligned with the leading slot 222a, and the fastener 300 is received in the aperture 172a and the leading slot 222a. The aperture 172b is aligned with the intermediate slot 222b and the fastener 302 is received in the aperture 172b and the intermediate slot 222b. The aperture 172c is aligned with trailing slot 222c and the fastener 304 is received in the aperture 172b and the intermediate slot 222b.

Focusing on the inner connecting segment 174, the leading aperture 180a is aligned with the leading slot 202a, and the fastener 310 is received in the leading aperture 180a and the leading slot 202a. The leading aperture 180d is aligned with the leading slot 202b, and the fastener 312 is received in the leading aperture 180d and the leading slot 202b. The trailing aperture 182a is aligned with the trailing slot 204a, and the fastener 314 is received in the trailing aperture 182a and the trailing slot 204a. The trailing aperture 182d is aligned with the trailing slot 204b, and the fastener 316 is received in the trailing aperture 182d and the trailing slot 204b.

The slots provide an additional degree of adjustability as their corresponding apertures can be adjusted longitudinally along the position of the slot before connecting the fasteners. It is understood that other adjusting feature can be used instead of with the slots, such as, for instance, rails.

In the rearward configuration, as a result of the rearward position of the lower frame member 154 relative to the upper frame member 152, the modular frame 150 induces a rearward ground contact area. The rearward ground contact area is different from the leading ground contact area in that the rearward ground contact area is disposed longitudinally rearwardly from the leading ground contact area, because the leading and trailing idler wheel assemblies 80, 85 and the support wheel assemblies 90, 91 (i.e., ground engaging members) move rearwardly along with the lower frame member 154. That being said, a length and a width of the rearward ground contact area is generally similar to the length and width of the leading ground contact area. Similarly, as a result of the rearward position of the lower frame member 154 relative to the upper frame member 152, other properties such as approach and departure angle also change.

Being able to adjust the ground contact area of the track system 50 can help make the track system 50 more suitable for a greater number of vehicles, and more suitable for a greater number of operating conditions, because the ground contact area of the track system 50 can be adjusted to better mimic to the ground contact area of the tire that was originally designed for a vehicle. Furthermore, as the track system 50 is configured to be used either as a front track system or a rear track system, adjusting the ground contact area can help optimize the steering angle of the vehicle. In addition, being able to adjust the position of the lower frame member relative to the upper frame member can help adapt the track system 50 to fit inside different vehicle wells.

It is contemplated that in some embodiments, the modular frame 150 could be configured such that the lower frame member 154 is connectable to the upper frame member 152 in two or more laterally spaced positions. Thus, the lower frame member 154 could be connected to the upper frame member 152 in an outward configuration and an inward configuration. In the outward configuration, the lower frame member 154 is positioned laterally more outwardly relative to the upper frame member 154 than in the inward configuration. As such, the ground contact area moves laterally when the modular frame 150 is adjusted from the inward configuration to the outward configuration.

In another modular aspect of the present technology, the ground contact area of the track system 50 can be further adjusted by moving the leading and trailing idler wheel assemblies 80, 85 from the connecting apertures 258a of the corresponding mounting plates to the connecting apertures 258b, by moving the support wheel assembly 90 from the leading support wheel aperture 210a to the leading support wheel aperture 210b, by moving the support wheel assembly 91 from the trailing support wheel aperture 214a to one of the trailing support wheel apertures 214b, 214c, 214d and/or by varying sizes of the leading and trailing idler wheel assemblies 80, 85 and/or the support wheel assemblies 90, 91.

In another modular aspect of the present technology, the lower frame member 154 is replaceable by an alternate lower frame member 156.

Figure 14A:
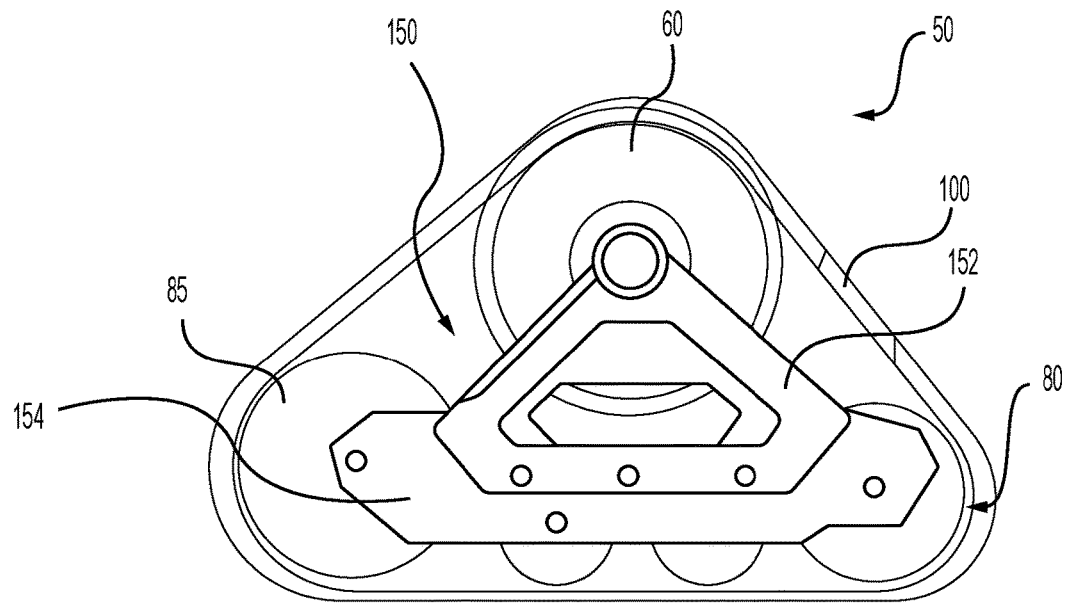
FIG. 14A is a schematic view of the track system of FIG. 1B with the upper and lower frame members.
Figure 14B:
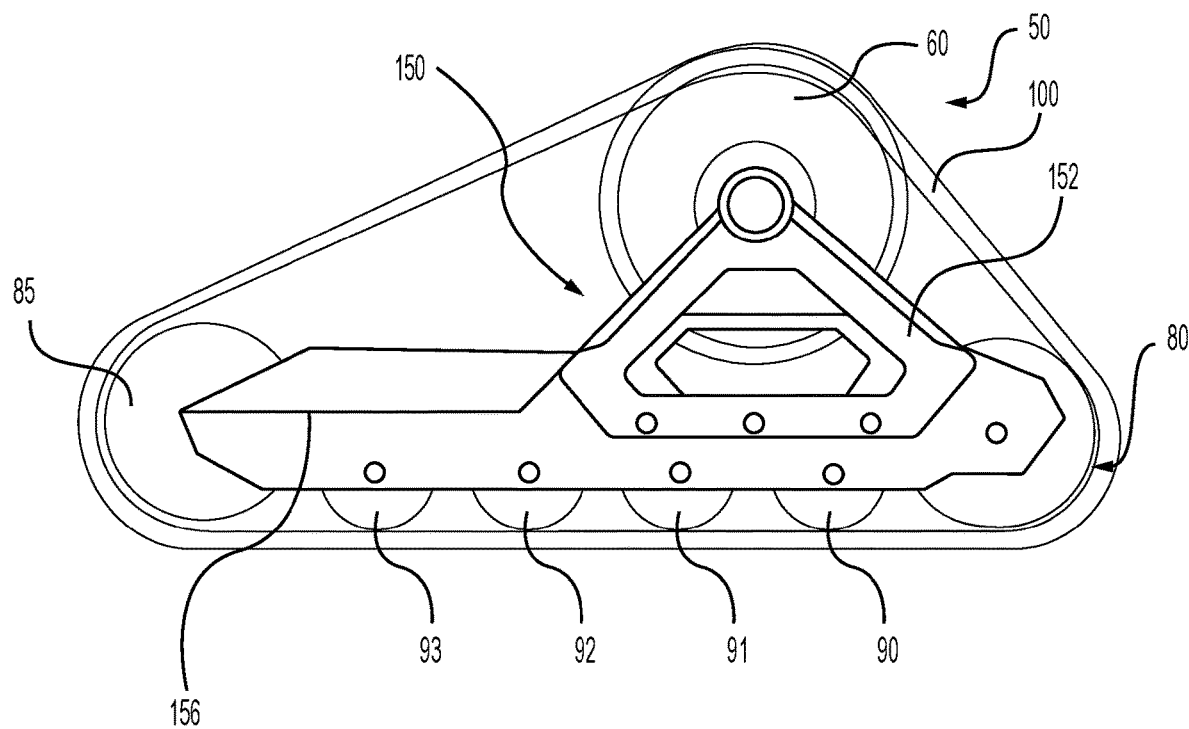
FIG. 14B is a schematic view of the track system of FIG. 1B with the upper frame member and an alternate lower frame member.

Referring to FIGS. 14A and 14B, schematic figures of the track system 50 is provided.

In FIG. 14A, the track system 50 has the upper frame member 152 that is connected to the lower frame member 152 in the leading configuration. The sprocket wheel assembly 60 is connected to the upper frame member 152, and the leading and trailing idler wheel assemblies 80, 85 and the two support wheel assemblies 90, 91 are connected to lower frame member 154 as described hereabove. The lower frame member 154 confers a lower frame member-specific ground contact area to the track system 50. It is contemplated that in other embodiments, the lower frame member 154 could confer other lower frame member-specific functions such as a lower frame member-specific camber angle, a lower frame member-specific toe angle, or a lower frame member-specific load distribution profile. The load distribution profile can be adjusted from one lower frame member to another by adding or removing support wheel assemblies, varying sizes of the support wheel assemblies, varying number of wheels in a lateral direction, etc.

In FIG. 14B, the track system 50 has the upper frame member 152 and an alternate lower frame member 156 that has replaced the lower frame member 154. The lower frame member 154 was replaced without disconnecting the upper frame member 152 from the axle of the vehicle 20.

The alternate lower frame member 156 has the same outer and inner connecting segments 170, 174 as the lower frame member 164. Thus, the alternate lower frame member 156 is connectable to the upper frame member 152 by the fasteners 300, 302, 304, 310, 312, 314, 316 as described above with reference to the lower frame member 154. Thus, the alternate lower frame member 156 is connectable to the upper frame member 152 in various configurations.

The alternate lower frame member 156 includes four support wheel assemblies 90, 91, 92, 93 that are connected thereto, such that the alternate lower frame member 156 is longer than the lower frame member 154. Thus, the upper segment 190 and the two lower segments 192a, 192b of the alternate lower frame member 156 is longer than the upper segment 190 and the two lower segments 192a, 192b of the lower frame member 154. Thus, the alternate lower frame member 156 confers an alternate frame member-specific ground contact area, where the alternate lower frame member-specific ground contact area is greater than the alternate lower frame member-specific ground contact area. In some embodiments, the alternate lower frame member-specific camber angle or the alternate lower frame member-specific toe angle could also change from the lower frame member 156 to the alternate lower frame member 156. It is contemplated that in other embodiments, the alternate lower frame member 156 could confer other alternate lower frame member-specific functions. It is contemplated that in some embodiments, the alternate lower frame member 156 could be different. For instance, the alternate lower frame member 156 could include three support wheel assemblies, or five or more. In other embodiments, the configuration of the leading, trailing and support wheel assemblies of the alternate lower frame member 156 could be different. For instance, the leading, trailing and support wheel assemblies could each only include a single wheel instead of laterally spaced wheels. Thus, the alternate lower frame member 156 is structurally and functionally different from the lower frame member 154.

The lower frame member 154 being replaceable with the alternate lower frame member 156 enables one to modify the track system 50 to achieve different functions.

The lower frame member 154 can provide better steerability than the alternate lower frame member 156 due to having a smaller ground contact area. Thus, the lower frame member 154 confers enhanced steering properties. Thus, the lower frame member 154 acts as a steering lower member. It is understood that other lower frame members could be configured to have an even smaller ground contact area, and thus could provide even better steering properties.

The alternate lower frame member 156 can provide better traction than the lower frame member 154 due to having a larger ground contact area (i.e., more support wheels). Thus, the alternate lower frame member 156 confers enhanced traction properties and can therefore act as a traction-enhancing lower member.

The lower member-specific function could be independent of the ground contact area induced thereby. For instance, two different lower frame members could induce a similar ground contact area, but one of the lower frame member could be bigger in the vertical direction than the other, such that the bigger lower frame member could increase clearance height of the vehicle of the track system to which the bigger lower frame member connects.

In any case, when better steerability is desired, the lower frame member 154 could be installed, and when better traction is required, the lower frame member 154 could be removed and replaced with the alternate lower frame member 156 as described above.

It is understood that the lower frame member 154 could be replaceable by two or more alternate lower frame members, where the two or more alternate lower frame members are different from one another (e.g., one of the alternate lower frame member includes three support wheel assemblies, and another one of the alternate lower frame member includes six support wheel assemblies).

Referring back to FIG. 1A, the left and right front track systems 50 have the lower frame member 154, whereas the left and right rear track systems 51 have the lower frame member 156. As mentioned above, the upper frame member 152 is configured to be connectable to both the front and rear axles on either of the left or right sides. Thus, the left and right front track systems 50 have enhanced steerability when compared to the left and right rear track systems 51, whereas the left and right rear track systems 51 have enhanced traction when compared to the left and right front track systems 50.

In some instances, the present technology can be provided and/or sold as track system kit. More precisely, the track system kit includes a track system, such as the track system 50 described hereabove, that has the modular frame 150 as well as the alternate lower frame member 156. In other words, the track system kit includes upper frame member 152, the lower frame member 154 and the alternate lower frame member 156. This track system kit enables, as mentioned above, one to change the properties of the track system as desired.

Figure 15A:
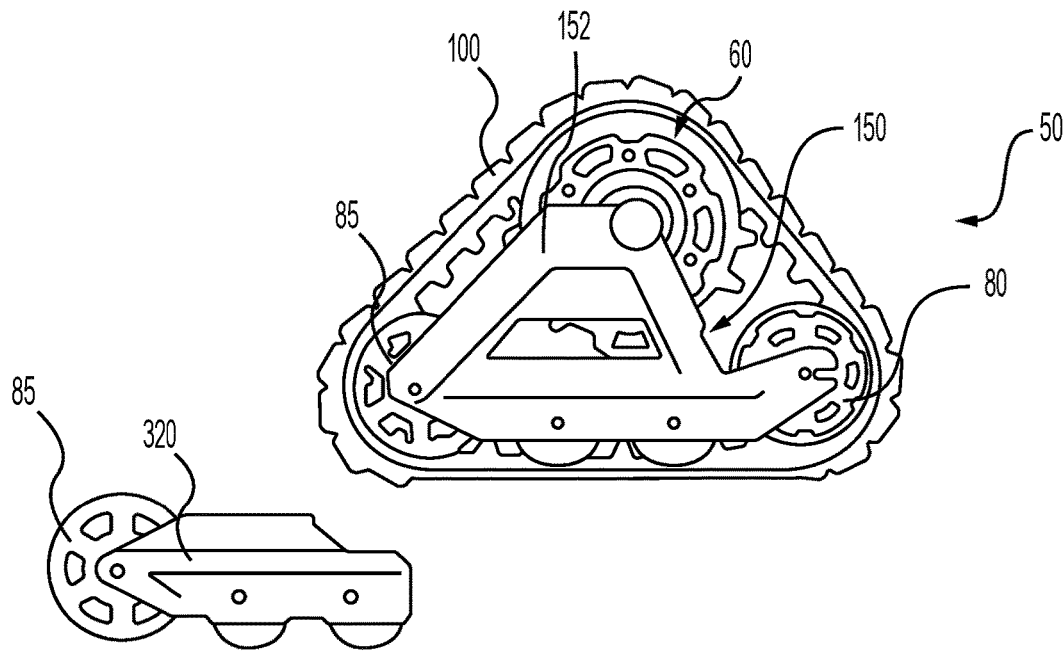
FIG. 15A is a schematic view of a track system with a modular frame in accordance to an alternate embodiment of the present technology.
Figure 15B:
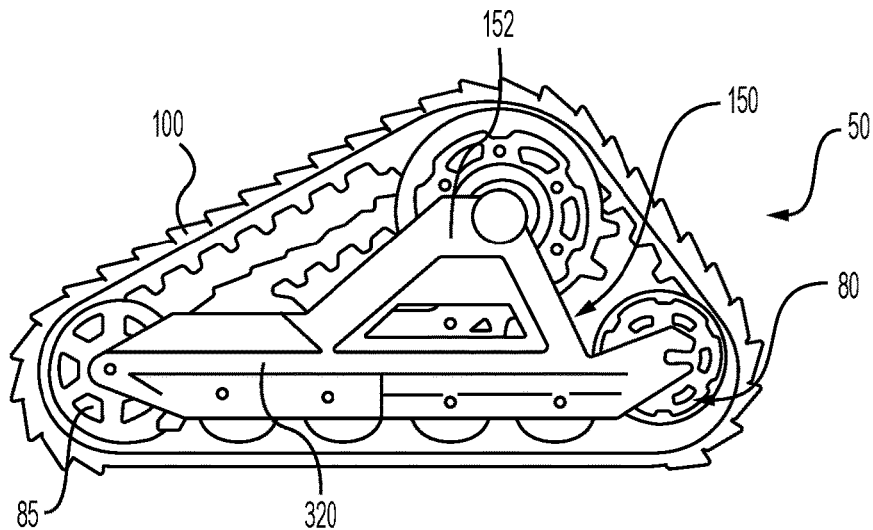
FIG. 15B is a schematic view of the track system of FIG. 15A with an extension frame member connected to the modular frame.

Referring to FIGS. 15A and 15B, a track system 50' according to an alternate embodiment of the present technology is shown. The track system 50' has similar features to the track system 50 and thus will not be re-described in detail herewith. Features of the track system 50' that are similar to those of the track system 50 described above have been labeled with the same reference numerals. In this embodiment, the upper and lower connecting sections 168, 198 are slightly different from those described above, but the upper and lower connecting sections 168, 198 work similarly. In this embodiment, an extension frame member 320 can removably connect to the lower connecting section 198 of a lower frame member. In some embodiments, the extension frame member 320 could be configured to connect to the upper frame member 152. The extension frame member 320 includes two support wheel assemblies and an idler wheel assembly. It is contemplated that in other embodiments the extension frame member 320 could include different number of additional support wheel assemblies and/or idler wheel assemblies. The extension frame member 320 could further modify properties of the track system 50'.

The various components of the track system 50 are made of conventional materials (e.g., metals and metal alloys in most cases, such as steel) via conventional manufacturing processes (e.g., casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present invention may become apparent to those skilled in the art. For example, a resilient element can be included between the upper frame member 152 and the lower frame member 154 in order to reduce vibration within the modular frame 150, to absorb a portion of shocks sustained by the track system 50, and/or to compensate for a camber angle of the vehicle. It is understood that resilient member could be different in terms of geometry, arrangement, locations, connections, etc. to confer a resilient connection between the upper frame member and the lower frame member. The foregoing description is intended to be exemplary rather than limiting.

What is claimed is:

1. A modular frame for a track system, the modular frame comprising:
an upper frame member operatively connectable to an axle of a vehicle and removably connectable to a first lower frame member, the first lower frame member being configured to connect with at least one of a support wheel assembly and an idler wheel assembly;
wherein the first lower frame member is connectable to the upper frame member in at least two configurations:
in a first of the at least two configurations, the upper frame member is in a first position relative to the first lower frame member;
in a second of the at least two configurations, the upper frame member is in a second position relative to the first lower frame member; and
wherein the first position is different from the second position; and
wherein connection of the upper frame member to the first lower frame member confers a first lower frame member-specific function to the track system.

2. The modular frame of claim 1, wherein the first lower frame member is replaceable with a second lower frame member, the second lower frame member being configured to connect with at least one of a support wheel assembly and an idler wheel assembly; and wherein connection of the upper frame member to the second lower frame member confers a second lower frame member-specific function to the track system.

3. The modular frame of claim 2, wherein the first lower frame member is replaceable without disconnection of the upper frame member from the axle.

4. The modular frame of claim 2, wherein the first lower frame member specific function and the second lower frame member specific function are different.

5. The modular frame of claim 2, wherein the second lower frame member is configured to operatively connect with one of: two support wheel assemblies, three support wheel assemblies and four support wheel assemblies.

6. The modular frame of claim 2, wherein:
the first lower frame member induces a first ground contact area;
the second lower frame member induces a second ground contact area, and
the first ground contact area is different from the second ground contact area.

7. The modular frame of claim 1, wherein when the upper frame member is adjusted from the first of the at least two configurations to the second of the at least two configurations, the first lower frame member moves in at least one of a:
longitudinal direction relative to the upper frame member; and
lateral direction relative to the upper frame member.

8. The modular frame of claim 1, wherein when the upper frame member is adjusted from the first configuration to the second configuration, the first ground contact area moves in at least one of a longitudinal direction, and a lateral direction.

9. A track system comprising:
the modular frame according to claim 1,
a sprocket wheel assembly rotationally connected to the upper frame member;
at least one idler wheel assembly rotationally connected to the first lower frame member;
at least one support wheel assembly rotationally connected to the first lower frame member; and
an elastomeric endless track surrounding the modular frame, the sprocket wheel assembly, the at least one idler wheel assembly and the at least one support wheel assembly.

10. A vehicle comprising:
a frame;
a seat disposed on the frame;
an engine supported by the frame; and
at least two track systems according to claim 9, the at least two track systems being operatively connected to the engine.

11. A modular frame for a track system, the modular frame comprising:
a first lower frame member removably connectable to an upper frame member, the first lower frame member being configured to connect with at least one of a support wheel assembly and an idler wheel assembly;
wherein the first lower frame member is connectable to the upper frame member in at least two configurations:
in a first of the at least two configurations, the first lower frame member is in a first position relative to the upper frame member; and
in a second of the at least two configurations, the first lower frame member is in a second position relative to the upper frame member,
wherein the first position is different from the second position; and
wherein connection of the first lower frame member to the upper frame member confers a first lower frame member-specific function to the track system.

12. The modular frame of claim 11, wherein the first lower frame member is replaceable with a second lower frame member, the second lower frame member being configured to connect with at least one of a support wheel assembly and an idler wheel assembly; and wherein connection of the second lower frame member to the upper frame member confers a second lower frame member-specific function to the track system.

13. The modular frame of claim 12, wherein the first lower frame member-specific function and the second lower frame member-specific function are different.

14. The modular frame of claim 12, wherein the second lower frame member is configured to operatively connect with one of: two support wheel assemblies, three support wheel assemblies and four support wheel assemblies.

15. The modular frame of claim 12, wherein:
the first lower frame member induces a first ground contact area;
the second lower frame member induces a second ground contact area, and
the first ground contact area is different from the second ground contact area.

16. The modular frame of claim 11, wherein the first lower frame member is replaceable with a third lower frame member.

17. The modular frame of claim 11, wherein when the first lower frame member is adjusted from the first configuration to the second configuration, induced ground contact area moves in at least one of a longitudinal direction, and lateral direction.

18. A track system comprising:
the modular frame according to claim 11,
a sprocket wheel assembly rotationally connected to the upper frame member;
at least one idler wheel assembly rotationally connected to the first lower frame member;

at least one support wheel assembly rotationally connected to the first lower frame member; and an elastomeric endless track surrounding the modular frame, the sprocket wheel assembly, the at least one idler wheel assembly and the at least one support wheel assembly.

19. A vehicle comprising:

a frame;

a seat disposed on the frame;

an engine supported by the frame; and at least two track systems according to claim 18, the at least two track systems being operatively connected to the engine.

\* \* \* \* \*